(12) United States Patent
Jiang et al.

(10) Patent No.: US 9,861,039 B2
(45) Date of Patent: Jan. 9, 2018

(54) MOWER AND CLUTCH

(71) Applicant: Johnson Electric S.A., Murten (CH)

(72) Inventors: Xiang Dong Jiang, Shen Zhen (CN);
John Hammar, Newtown, CT (US);
Man Fat Wong, Hong Kong (CN);
Ming Wai Chau, Hong Kong (CN);
Allan Madrid, Hong Kong (CN)

(73) Assignee: Johnson Electric S.A., Murten (CH)

( * ) Notice: Subject to any disclaimer, the term of this patent is extended or adjusted under 35 U.S.C. 154(b) by 49 days.

(21) Appl. No.: 15/011,513

(22) Filed: Jan. 30, 2016

(65) Prior Publication Data

US 2016/0219788 A1 Aug. 4, 2016

(30) Foreign Application Priority Data

Jan. 30, 2015 (CN) .......................... 2015 1 0050694
Sep. 6, 2015 (CN) .......................... 2015 1 0559777
Sep. 6, 2015 (CN) .......................... 2015 1 0559787
Sep. 6, 2015 (CN) .......................... 2015 1 0561528
Sep. 6, 2015 (CN) .......................... 2015 1 0561529

(51) Int. Cl.
*A01D 34/67* (2006.01)
*A01D 69/08* (2006.01)
*A01D 34/76* (2006.01)
*F16H 37/12* (2006.01)
*A01D 34/66* (2006.01)

(52) U.S. Cl.
CPC ............. *A01D 69/08* (2013.01); *A01D 34/66* (2013.01); *A01D 34/76* (2013.01); *F16H 37/124* (2013.01)

(58) Field of Classification Search
CPC ........ A01D 34/76; A01D 34/63; A01D 34/64; A01D 69/00; A01D 69/08; A01D 34/66; A61M 5/158; A61M 2005/1585; B60S 1/166; B60S 1/583; B60S 1/0491; B60K 25/02; B60R 25/02153; E05B 81/25; E05B 81/13; E05B 79/02; F01B 9/047; F16H 19/043; F16H 27/08; F16H 7/12; F16H 7/1281; F16H 37/124; F02B 67/06
USPC .......... 123/197.1, 197.4, 55.5; 56/10.8, 11.3, 56/11.6, 11.8; 74/31, 89.16, 436; 292/201, 199, 336.3; 70/186, 252
See application file for complete search history.

(56) References Cited

U.S. PATENT DOCUMENTS

| | | | | |
|---|---|---|---|---|
| 4,674,781 A | * | 6/1987 | Reece ..................... | E05B 81/25 292/201 |
| 4,702,117 A | * | 10/1987 | Tsutsumi ................ | E05B 81/25 254/230 |
| 4,793,640 A | * | 12/1988 | Stewart, Sr. ........... | E05B 81/25 292/199 |
| 4,813,215 A | * | 3/1989 | Chase .................... | A01D 34/76 56/11.3 |
| 5,406,859 A | * | 4/1995 | Belford .................. | F01B 9/047 123/197.1 |

(Continued)

*Primary Examiner* — Robert E Pezzuto
(74) *Attorney, Agent, or Firm* — Muncy, Geissler, Olds & Lowe, P.C.

(57) ABSTRACT

A clutch for a mower has an electric motor, a drive mechanism connected with the motor and an output mechanism connected with the drive mechanism. The drive mechanism has a cam driven by the motor and a cam follower reciprocating along with the cam. Reciprocation of the cam follower switches the output mechanism between a transmission state and a non-transmission state.

47 Claims, 21 Drawing Sheets

(56) References Cited

U.S. PATENT DOCUMENTS

| | | | | |
|---|---|---|---|---|
| 7,140,213 B2* | 11/2006 | Feucht | ............... | B60R 25/02153 |
| | | | | 70/186 |
| 7,217,206 B2* | 5/2007 | Stone | ...................... | F01L 1/024 |
| | | | | 474/110 |
| 7,784,459 B2* | 8/2010 | Abrams | .................. | A61M 11/02 |
| | | | | 128/200.14 |
| 8,617,108 B2* | 12/2013 | Ramadoss | ............. | A61M 5/158 |
| | | | | 604/131 |
| 8,840,495 B2* | 9/2014 | Comsa | ...................... | F01L 1/02 |
| | | | | 474/110 |
| 9,464,697 B2* | 10/2016 | Antchak | .................. | F02B 67/06 |
| 2005/0192142 A1* | 9/2005 | Stone | ...................... | F01L 1/024 |
| | | | | 474/101 |

* cited by examiner

MOWER AND CLUTCH

CROSS REFERENCE TO RELATED APPLICATIONS

This non-provisional patent application claims priority under 35 U.S.C. § 119(a) from Patent Application No. 201510050694.4 filed in The People's Republic of China on Jan., 30, 2015, from Patent Application No. 201510559777.6 filed in The People's Republic of China on Sep. 6, 2015, from Patent Application No. 201510559787.X filed in The People's Republic of China on Sep. 6, 2015, from Patent Application No. 201510561529.5 filed in The People's Republic of China on Sep. 6, 2015, and from Patent Application No. 201510561528.0 filed in The People's Republic of China on Sep. 6, 2015, the entire contents of which are hereby incorporated by reference.

FIELD OF THE INVENTION

This invention relates to a mower and in particular to a clutch suitable for selectively transmitting power from an engine to a cutter head of the mower.

BACKGROUND OF THE INVENTION

A mower is widely used for trimming and cutting lawn to keep the lawn smooth. The existing mower generally includes an engine, a cutter head and a clutch. The engine acts as a power source for driving the cutter head through a transmission belt of the clutch, and the motion of the clutch tensions or relaxes the transmission belt, wherein the engine drives the cutter head for performing a mowing operation upon tensioning of the transmission belt, and the transmission between the engine and the cutter head is cut off upon relaxing of the transmission belt. The existing clutch is usually operated and controlled manually via a handle, which is laborious in operation and is less attractive in appearance.

SUMMARY OF THE INVENTION

Hence there is a desire for a simple yet effective motorized clutch for a lawn mower.

In one aspect, a clutch is provided which includes motor, a transmission mechanism connected with the motor and an output mechanism connected with the transmission mechanism. The transmission mechanism comprises a cam driven by the motor and a follower reciprocating along with the cam, and the reciprocation of the follower switches the output mechanism between a transmission state and a non-transmission state.

In another aspect, a clutch is provided which includes a motor, a transmission mechanism connected with the motor and an output mechanism connected with the transmission mechanism. The transmission mechanism is configured to drive the output mechanism to switch between a transmission state and a non-transmission state. The clutch further comprises a self-locking mechanism interacting with the transmission mechanism, wherein when the output mechanism is in the transmission state, the self-locking mechanism is configured to lock the output mechanism in the transmission state.

In another aspect, a clutch is provided which includes a motor, a transmission mechanism connected with the motor and an output mechanism connected with the transmission mechanism. The transmission mechanism is configured to drive the output mechanism to switch between a transmission state and a non-transmission state. The clutch comprises at least one electric switch electrically connected with the motor, and turn-on or turn-off of the electric switch is controlled by the transmission mechanism.

In another aspect, a clutch is provided which includes a motor, a transmission unit connected with the motor and an output mechanism connected with the transmission unit. The output mechanism is configured to switch between a transmission state and a non-transmission state under the driving of the transmission unit. The transmission mechanism comprises a cam driven by the motor and a follower driven by the cam. An outer surface of the follower contacts an outer edge of the cam, and the cam, while rotating, drives the follower to perform a reciprocating linear motion. A rise travel of the follower from the contact with a proximal point of the cam to the contact with a distal point of the cam switches the output mechanism to the transmission state, and a return travel of the follower from the distal point contact with the cam to the proximal point contact with the cam switches the output mechanism to the non-transmission state.

In still another aspect, a mower is provided which includes an engine, a cutter head and the clutch as described above. The power of the engine can be transferred to the cutter head for performing mowing operation when the output mechanism of the clutch is in a transmission state, and a transmission between the engine and the cutter head is cut off when the output mechanism of the clutch is in a non-transmission state.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

FIG. 1 through FIG. 8 illustrate a mower according to a first embodiment of the present invention.

Figure 1:
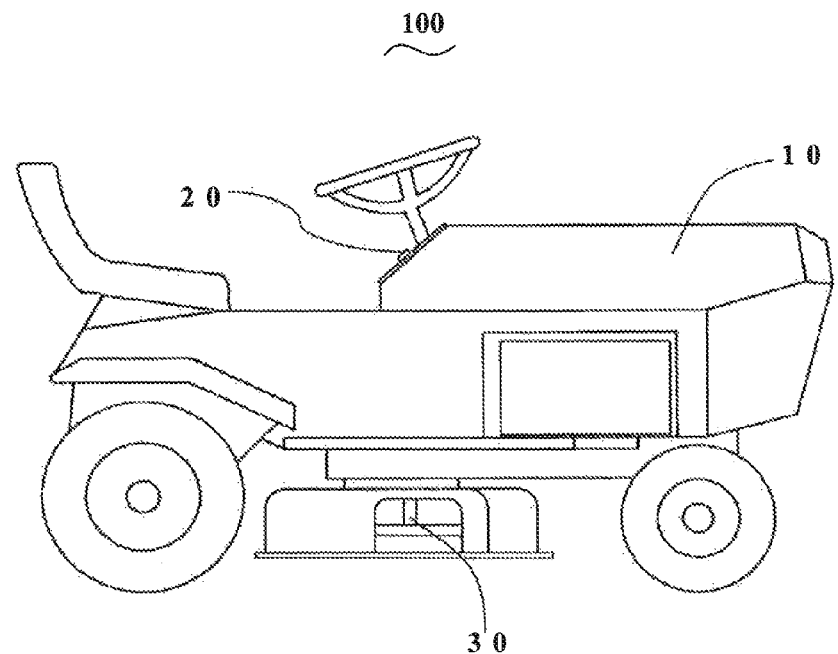
FIG. 1 is a schematic view of a mower according to a first embodiment of the present invention.
Figure 2:
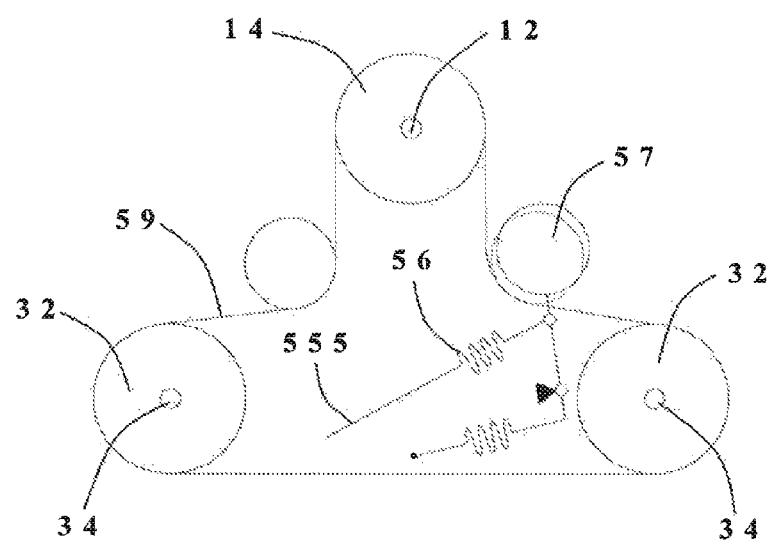
FIG. 2 is a schematic view of a transmission of the mower.
Figure 3:
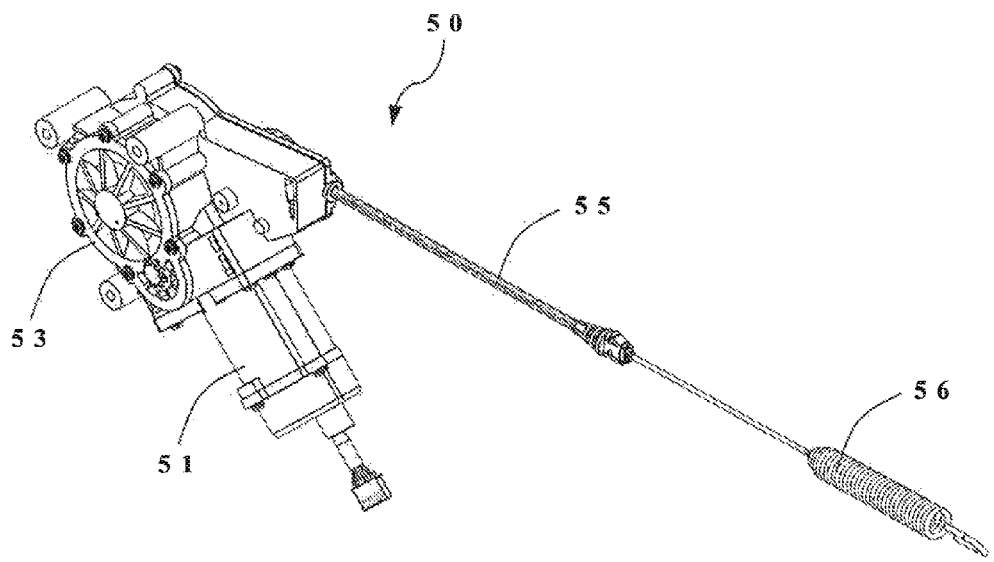
FIG. 3 is a view of a clutch of the mower.

As shown in FIG. 1 and FIG. 2, the mower 100 of the first embodiment of the present invention comprises an engine (not shown in the figure) provided inside a housing 10, a cutter head 30, and a clutch 50 transmitted between the engine and the cutter head 30. A rotating shaft 12 of the engine fixedly connects a driving pulley 14 thereon, there may be a single cutter head 30 or a plurality of cutter heads 30, and the mower 100 of the embodiment has two cutter heads 30. Each cutter head 30 is fixedly connected onto a mandrel 34 of a driven pulley 32. Referring also to FIG. 3, the clutch 50 comprises a motor 51, a reduction transmission mechanism 53 and an output mechanism 55. A transmission belt 59 is mounted on the driving pulley 14 and the two driven pulleys 32, which can transfer the power of the engine to the cutter head 30 so as to drive the cutter head 30 to rotate and mow.

The motor 51, which serves as a power source of the whole clutch 50, is preferably a permanent magnet DC motor. A button 20 (see FIG. 1) may be provided on a body of the mower 100 for controlling the clutch 50. The reduction transmission mechanism 53 is pivotably connected with a rotor of the motor 51, such that the rotation of the motor 51 is output after being decelerated, so as to drive the motion of the output mechanism 55. In this embodiment, the output mechanism 55 may comprise a traction mechanism having a traction cable 555. The traction mechanism 55 is connected with a clutch pulley 57, and the traction mechanism 55, while operating, drives the clutch pulley 57 to switch between a first position and a second position, causing the clutch pulley 57 to abut against or be separated from the transmission belt 59. Specifically, when the clutch pulley 57 is located in a first position as shown by a solid line in FIG. 2, the output mechanism 55 is in an initial or non-transmission state, the clutch pulley 57 is separated from the transmission belt 59, and the transmission belt 59 is relaxed, which cannot transmit the power. When the clutch pulley 57 is located in a second position as shown by a dotted line in FIG. 2, the output mechanism is in a transmission state, the clutch pulley 57 abuts against the transmission belt 59 and the transmission belt 59 is tensioned, in which case the cutter head 30 can be driven to rotate for performing the mowing operation by the engine.

Figure 4:
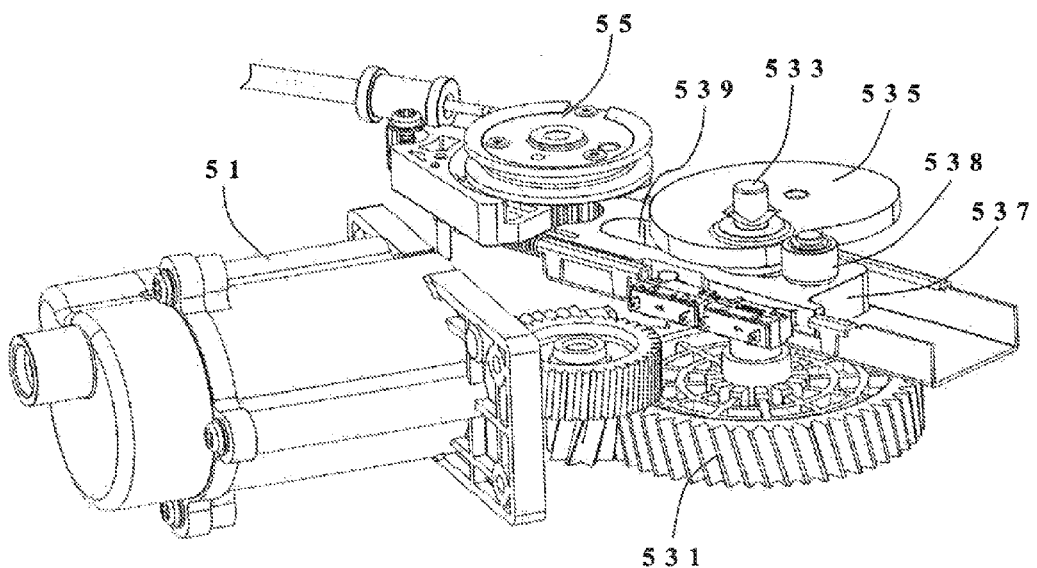
FIG. 4 is a view of the clutch from another angle, in which a portion of housing is removed to reveal an internal mechanism.
Figure 5:
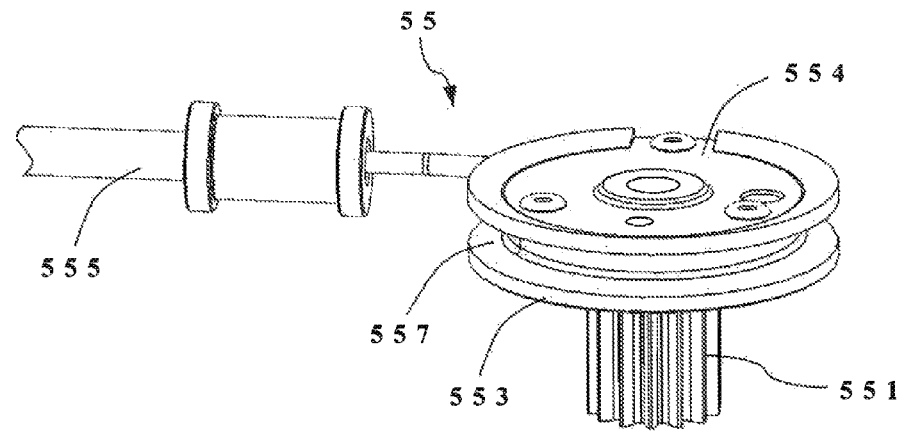
FIG. 5 illustrates a traction mechanism of the clutch.

Referring also to FIG. 4 and FIG. 5, the reduction transmission mechanism 53 comprises a gear unit 531, a cam 535 driven by the gear unit 531, a follower (a boss in this embodiment) 538 interacting with the cam 535, and a rack 537 fixed with the follower 538. The gear unit 531 is connected with the motor 51 and may comprise a plurality of intermeshing gears, so as to decelerate the high-speed rotation of the motor 51. The gear unit 531 has an output shaft 533, wherein the output shaft 533 has a relatively low output rotation speed after being decelerated. The cam 535 is fixedly connected to a top of the output shaft 533 and rotates in synchronous with the output shaft 533. The boss 538 is provided at an end of the rack 537, and an outer surface of the boss 538 contacts an outer edge of the cam 535. The other end of the rack 537 is meshed with a reel 553, and the cam 535 operates with the boss 538 while rotating, so as to drive the boss 538 to urge the rack 537 to perform a reciprocating linear motion and thus urge the reel 553 to rotate, such that the traction cable 555 is wound up on the reel 553 or released outwards, thereby urging the clutch pulley 57 to move between the first position and the second position.

In this embodiment, the rack 537 overlaps with the cam 535, and the top of the output shaft 533 is fixedly connected with the cam 535 after passing through the rack 537. The boss 538 is provided at an end of the rack 537 away from the reel, the boss 538 is located on a path of rotation of the cam 535, and the cam 535 interacts with the boss 538 while rotating with the output shaft 533, so as to drive the boss 535 to urge the rack 537 to perform the reciprocating linear motion. In other embodiments, the cam 535 and the rack 537 may also be arranged side by side, and the cam 535 interacts with the end of the rack 537 to drive the rack 537 to move transversely. In this embodiment, in order to facilitate the movement of the rack 537, an elongated slot 539 is formed at a position of the rack 537 near the boss 538, wherein the slot 539 extends along a length direction of the rack 537, the output shaft 533 is connected with the boss 538 after passing through the slot 539, and when the rack 537 moves back and forth, the output shaft 533 moves inside the slot 539 with respect to the rack 537.

Figure 6:
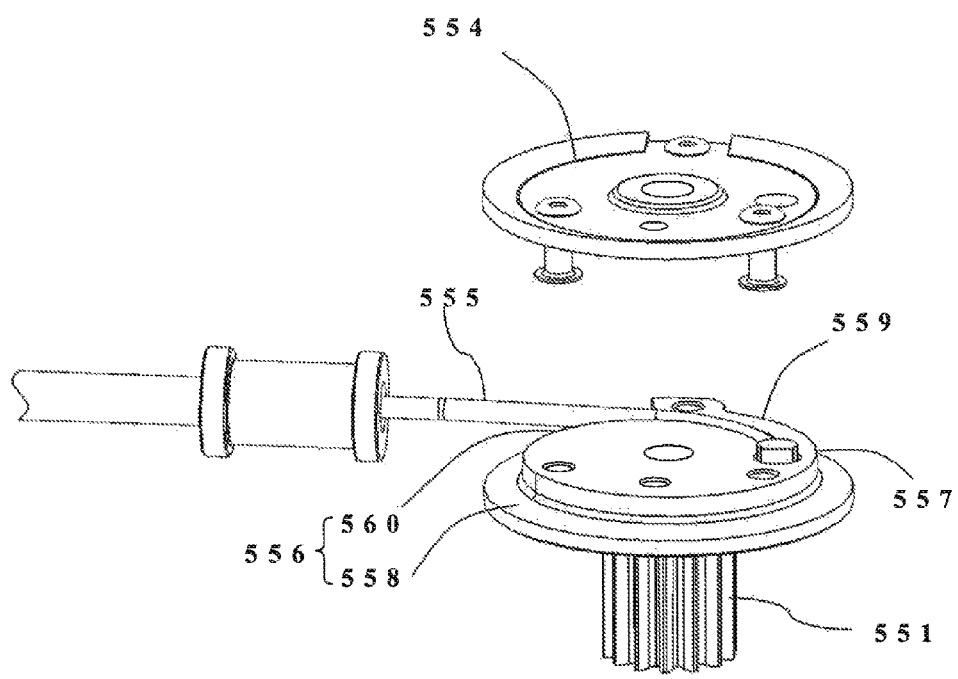
FIG. 6 is an exploded view of the traction mechanism.

As shown in FIG. 5 and FIG. 6, the traction mechanism 55 is located at the other end of the rack 537, i.e. the end remote from the cam 535, and comprises a driving gear 551 meshed with the rack 537, the reel 553 connected onto the driving gear 551 and the traction cable 555 wound up on the reel 553. In this embodiment, the reel 553 and the driving gear 551 form an integrative structure, and both of them are coaxially arranged and are positioned inside the housing of the clutch 20 through a pivot. In some embodiments, the driving gear 551 and the reel 553 may also be formed separately, and then integrally assembled to form synchronous rotation.

In this embodiment, the reel 553 comprises a cover plate 554 and a reel body 556 which are assembled together. The reel body 556 comprises a bottom plate 558 and a reel disc 560 provided at one side of the bottom plate 558 facing the cover plate 554, a circular groove 557 is formed among circumferential outer surfaces of the cover plate 554, the bottom plate 558 and the reel disc 560 for winding up the traction cable 555, an axial end surface of the reel disc 560 towards the cover plate is provided with a fixed groove 559 which is in communication with the annular groove 557, one end of the traction cable 555 extends into the fixed groove 559 and is fixed therein, and the other end can be connected with the clutch pulley 57 through a spring 56. In this embodiment, the cover plate 554 can be fixedly connected with the reel body 556 through a rivet, a screw or the like, so as to keep the traction cable 555 on the reel 553 and to avoid disconnection from the reel 553. Preferably, the reel body 556 may be a powder metallurgy part and the cover plate 554 may be a stamped part. The fixed groove 559 is arc-shaped, which can prevent the traction cable 555 from fracturing.

Figure 6A:
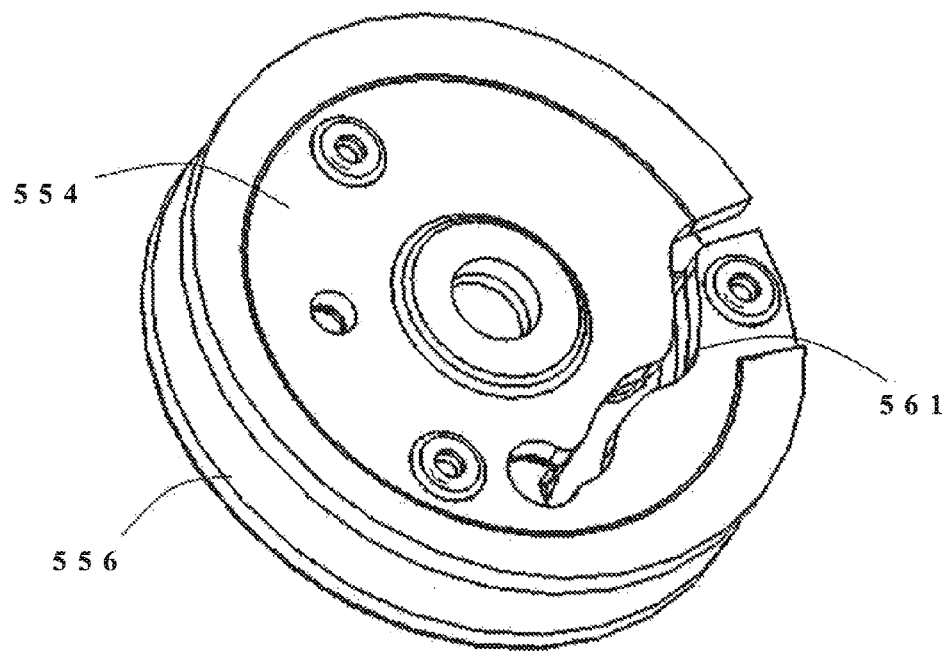
FIG. 6A illustrates another embodiment of the reel in the clutch of FIG. 3.

FIG. 6A illustrates another structure of the reel 553, which differs from the previously described reel in that its cover plate 554 is provided thereon with a through-groove 561 corresponding to a position of the fixed groove 559 for the traction cable to pass through. Preferably, the through groove 561 has a shape substantially consistent with that of the fixed groove 559, but not exactly the same so that it is not easy for the cable to pass through the through-groove when under tension.

Figure 7:
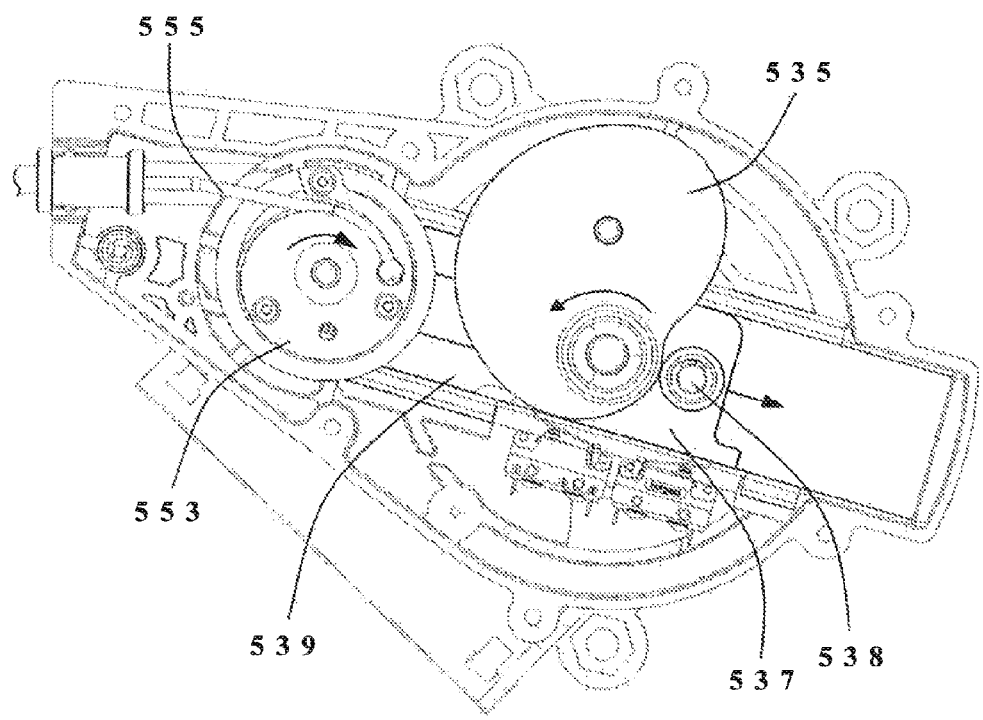
FIG. 7 is a partial view of the clutch driving a clutch pulley to abut against a transmission belt.
Figure 7A:
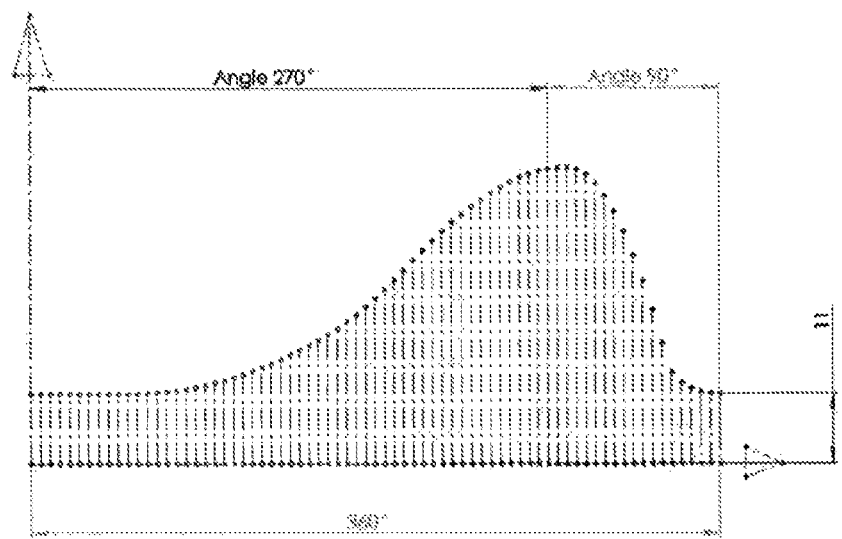
FIG. 7A is a displacement diagram of a boss in the clutch of FIG. 3.
Figure 8:
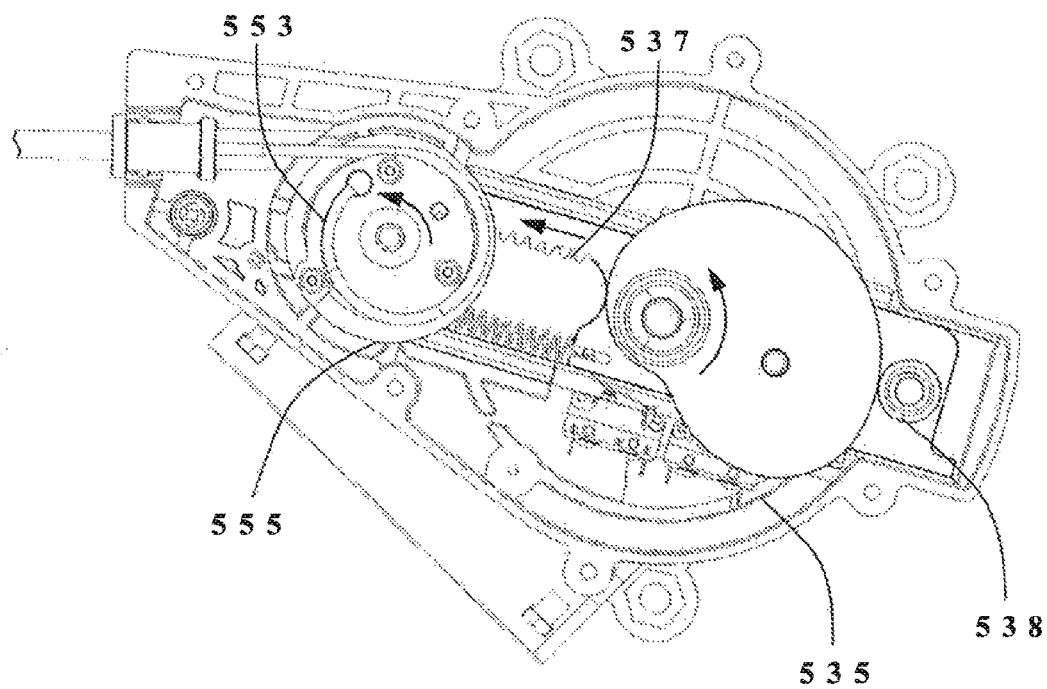
FIG. 8 is a partial view of the clutch drives the clutch pulley in a transmission state.

In the present embodiment, the gear unit 531 drives the cam 535 to rotate in an anticlockwise direction as shown in FIG. 7. A rise travel of the boss 538 moving from contact with a proximal point of the cam 535 to contact with a distal point of cam 535 switches the output mechanism 55 to the transmission state, and a return travel of the boss 538 moving from contact with the distal point of the cam 535 to contact with the proximal point of the cam 535 switches the output mechanism 55 to the non-transmission state. Preferably, the cam 535 has a motion angle for rise travel of less than 300 degrees and a motion angle for return travel of less than 100 degrees. More preferably, a profile curve of the cam 535 gives the boss 538 a displacement diagram as shown in FIG. 7A, wherein the cam 535 has the motion angle for rise travel of 270 degrees, and the motion angle for return travel of 90 degrees. According to above-mentioned configurations, the rise travel of boss 538 has a relatively slow speed, and the return travel has a relatively fast speed, so as to ensure that the mowing operation is able to be stopped quickly, thereby improving safety. In the rise travel of boss 538, the rack 537 is moved towards the direction away from the traction mechanism 55, so as to drive the driving gear 551 and the reel 553 to rotate in a clockwise direction, the traction cable 555 is progressively wound up on the reel 553, such that the traction cable 555 released outside is shortened gradually, and the clutch pulley 57 abuts against the transmission belt 59. In the return travel of boss 538, the rack 537 is moved towards the traction mechanism 55, so as to drive the reel 553 to rotate in an anticlockwise direction, the traction cable 555 is released outwards, and the clutch pulley 57 is separated from the transmission belt 59. Preferably, a spring 56 is connected between the traction cable 555 and the clutch pulley 57 to buffer an acting force on the clutch pulley 57. In addition, the clutch needs to overcome a tensile deformation force of the spring 56 when winding the traction cable 555 on the reel 553, and a slower winding speed can be obtained, and when the reel 553 rotates in an anticlockwise direction and releases the traction cable 555, a reset force of the spring 56 provides a tensile force, which accelerates the release of the traction cable 555.

Particularly, when the transmission mechanism 53 drives the clutch pulley 57 to move to the first position as shown by a solid line in FIG. 2, the clutch pulley 57 is separated from the transmission belt 59, the transmission belt 59 is relaxed, and the power of the engine will not be transferred to the cutter head 30. When the transmission mechanism 53 drives the clutch pulley 57 to the second position as shown by a dashed line in FIG. 2, the clutch pulley 57 abuts against the transmission belt 59, the transmission belt 59 is tensioned, and the power of the engine is transferred to the cutter head 30, in order to rotate the cutter head 30.

Referring also to FIG. 4 and FIG. 5, the transmission mechanism 53 comprises the gear unit 531, the cam 535 driven by the gear unit 531, a cam follower (a boss in this embodiment) 538 interacting with the cam 535, the rack 537 fixed with the boss 538, and the reel 553 meshed with the rack 537. An illustrative construction of the follower is described in the embodiment of FIG. 29 to FIG. 36.

The gear unit 531 is connected with the motor 51 and may comprise a plurality of intermeshing gears, so as to decelerate the high-speed rotation of the motor 51. The gear unit 531 has the output shaft 533, wherein the output shaft 533 has a relatively low output rotation speed after being decelerated. The cam 535 overlaps with the rack 537, and the top of the output shaft 533 is fixedly connected with the cam 535 after passing through the rack 537. The boss 538 is provided at the end of the rack 537, and the outer surface of the boss 538 is contacted with the outer edge of the cam 535. The cam 535 interacts with the boss 538 while rotating, so as to drive the boss 538 to urge the rack 537 to perform the reciprocating linear motion. To facilitate the movement of the rack 537, an elongated slot 538 is formed at a position of the rack 537 near the boss 538, and the output shaft 533 is connected with the cam 535 after passing through the slot 538, and when the rack 537 moves back and forth, the output shaft 533 moves inside the slot 538 with respect to the rack 537.

The reel 553 is meshed with the other end of the rack 537, the traction cable 555 is connected onto the reel 553, and the rack 537 moves back and forth, which in turn drives the reel 553 to rotate in a clockwise or an anticlockwise direction, thus causing the traction cable 555 to be wound up or released.

In an initial state, as shown in FIG. 2 and FIG. 7, the clutch pulley 57 is in the first position and is not contact with the transmission belt 59 which is in a relaxed state, the rack 537 of the clutch 50 is near the reel 553, and the boss 538 on the rack 537 is contacted with the proximal point of the cam 535, the traction cable 555 is released outwards with a maximum length, and the spring 56 is in a natural state. When there is a need to start mowing, the button 20 is pressed to start the motor 51, the cam 535 is driven to rotate in a low speed by the gear unit 531, the contact point of the boss 538 and the cam 535 moves from the proximal point to the distal point, so as to push the rack 537 away from the reel 553, which in turn rotates the reel 553 clockwise, the traction cable 555 is gradually wound up on the reel 553, the spring 56 is tensioned to urge the clutch pulley 57 to move towards the second position, in order to abut against the transmission belt 59 for tensioning it, and the power of the engine 10 can be transferred to the cutter head 30 via the transmission belt 59, so as to drive the cutter head 30.

At this time, the motor 51 is powered-off, and the clutch 50 is locked in a current state by a self-locking mechanism (not shown in this embodiment, and an illustrative construction of the self-locking mechanism is described in the embodiment of FIG. 9 to FIG. 18 below), the reel 553 keeps the traction cable 555 in a retracted state, and the transmission belt 59 keeps tensioning, thereby allowing the engine to drive the cutter head 30 to rotate continuously to perform the mowing operation. In the embodiment of the present invention, the self-locking mechanism can be a one-way clutch part, which allows the cam 536 to rotate towards an anticlockwise direction, but prevent it from rotating clockwise. The self-locking mechanism for example can be arranged between the 533 of the transmission mechanism 53 and the gear fixed to the output shaft 533. It can be appreciated that the self-locking mechanism can also be achieved by adopting other suitable structures which can lock the clutch 50 in the current state, and can also be arranged on other suitable positions.

When there is a need to stop the mowing operation, the motor 51 is powered on again, the cam 535 continues to rotate under the driving of the motor 51, and the contact point with the boss 538 moves from the distal point to the proximal point, the rack 537 moves towards the reel 553 reversely, which drives the reel 553 to rotate anticlockwise and releases the traction cable 555 outwards. The clutch pulley 57 is reset to the first position from the second position, and is separated from the transmission belt 59, so that the power transmission between the engine 10 and the cutter head 30 is disconnected, and the whole clutch 50 is returned to the initial state.

The mower 100 of the present invention takes the motor 51 as the power source, wherein the reel disc 61 is driven to rotate in different directions through the back-and-forth movement of the rack 537 of the clutch 57, and the traction cable 555 is tensioned or released, which in turn drives the clutch pulley 57 to be close to or away from the belt 59. The mower 100 has simple structure and fast response speed, and when compared to a hand lever which requires manual operation in the conventional technique, the user operation is simpler and less laborious. In addition, omission of the hand lever makes the appearance more aesthetic, which can be widely used in power equipment such as mowers and the like.

FIG. 9 through FIG. 18 illustrate a mower according to a second embodiment of the present invention.

Figure 9:
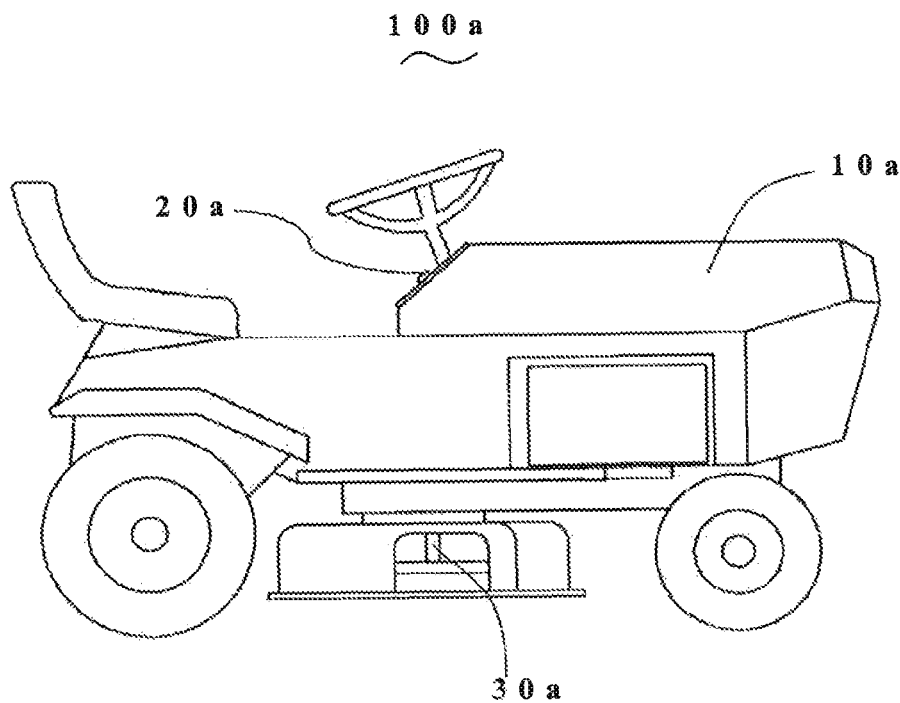
FIG. 9 is a schematic view of a mower according to a second embodiment of the present invention.
Figure 10:
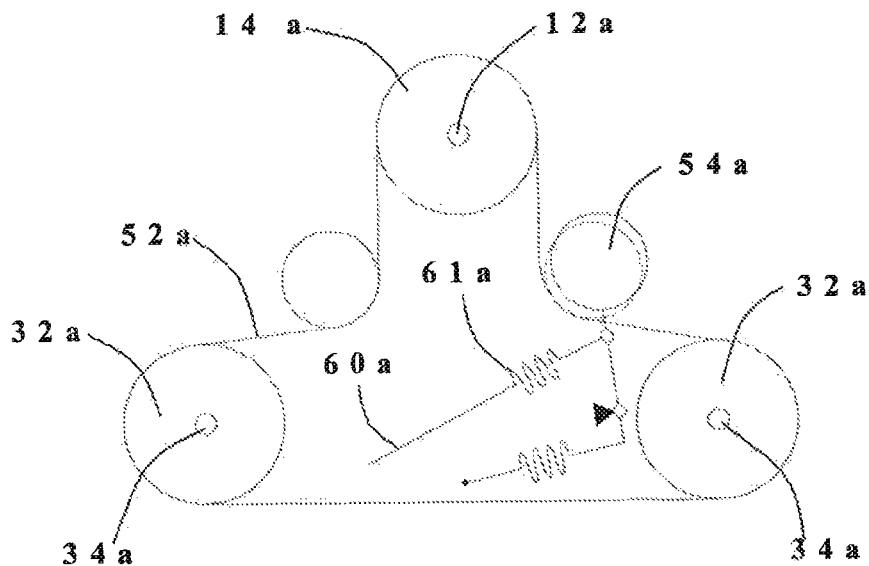
FIG. 10 is a schematic view of a transmission of the mower of FIG. 9.
Figure 11:
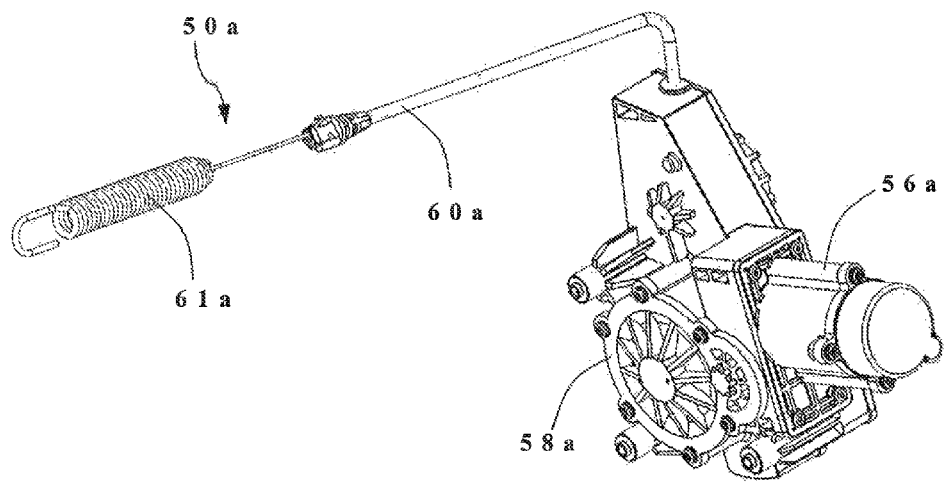
FIG. 11 is a view of a clutch of the mower of FIG. 9.

As shown in FIG. 9 to FIG. 11, a mower 100a of the second embodiment of the present invention comprises an engine (not shown in the figure) provided inside a housing 10a, a cutter head 30a, and a clutch 50a transmitted between the engine and the cutter head 30a.

As shown in FIG. 10, a rotating shaft 12a of the engine fixedly connects a driving pulley 14a thereon. There may be a single cutter head 30a or a plurality of cutter heads 30a, and the mower 100a of the embodiment has two cutter heads 30a. Each cutter head 30a is fixedly connected onto a mandrel 34a of a driven pulley 32a.

Referring also to FIG. 11, the clutch 50a comprises a motor 56a, a reduction transmission mechanism 58a and an output mechanism. A transmission belt 52a is mounted on the driving pulley 14a and the two driven pulleys 32, which can transfer the power of the engine to the cutter head 30a so as to drive the cutter head 30a to rotate and mow.

The motor 56a, which serves as a power source of the whole clutch 50a, is preferably a permanent magnet DC motor. A button 20a (see FIG. 9) may be provided on a body of the mower 100a for controlling the clutch 50a. The output mechanism comprises a traction cable 60a and a reel 72a driven by a rack 70. The traction cable 60a is connected to a clutch pulley 54a through a spring 61a. Upon operating, the output mechanism drives the clutch pulley 54a to switch between a first position and a second position, causing the clutch pulley 54a to abut against or be separated from the transmission belt 52a. Specifically, when the clutch pulley 54a is located in a first position as shown by a solid line in FIG. 10, the output mechanism is in the non-transmission state, the clutch pulley 54a is separated from the transmission belt 52a, and the transmission belt 52a is relaxed, which cannot transmit the power. When the clutch pulley 54a is located in a second position as shown by a dotted line in FIG. 10, the output mechanism is in the transmission state, the clutch pulley 54a abuts against the transmission belt 52a and the transmission belt 52a is tensioned, in which case the cutter head 30a can be driven to rotate for performing the mowing operation by the engine.

Figure 12:
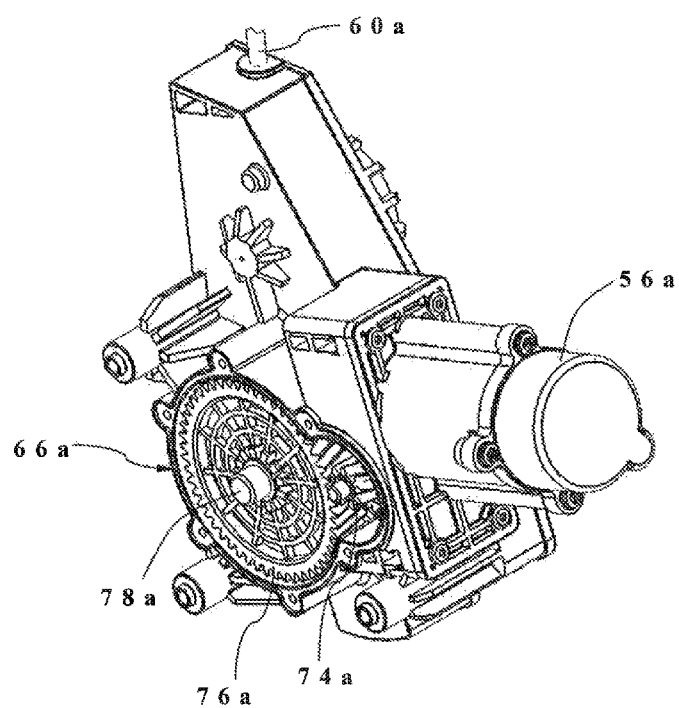
FIG. 12 is a view of the clutch of FIG. 11 with a portion of housing removed.
Figure 15:
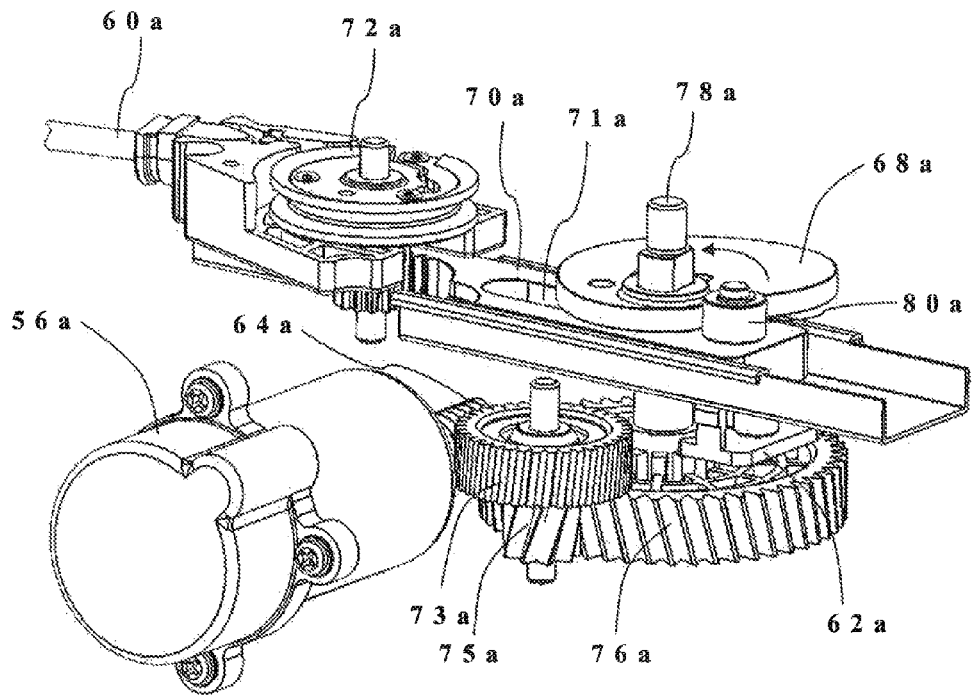
FIG. 15 illustrates an internal structure of the speed reduction transmission mechanism of the clutch of FIG. 11.
Figure 16:
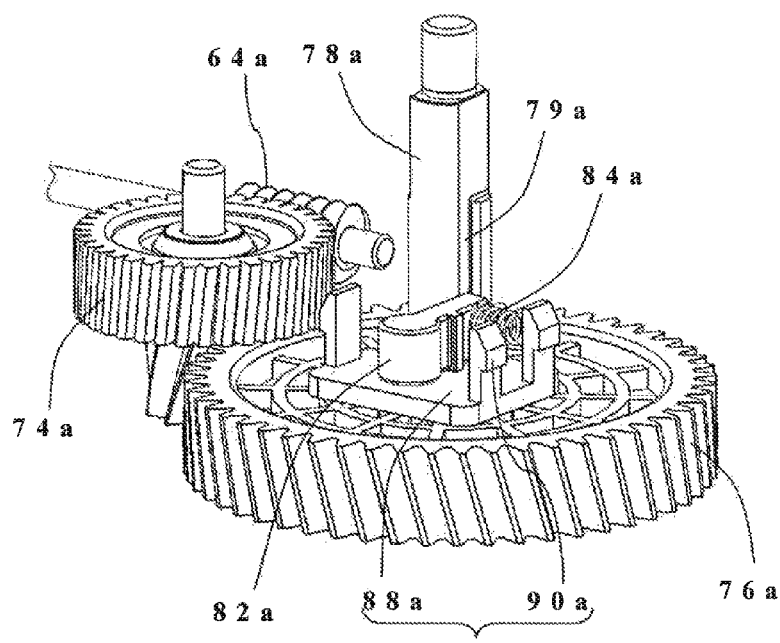
FIG. 16 illustrates the structures of the gear unit and self-locking unit of the clutch of FIG. 11.

Refer also to FIG. 12 and FIG. 15, the motor 56a includes an output shaft which is preferably a worm 64a. The reduction transmission mechanism 58a comprises a gear unit 66a meshed with the worm, a cam 68a driven by the gear unit 66a, a follower (a boss in this embodiment) 80a interacting with the cam 68a, and the rack 70a fixed with the boss 80a. Opposite ends of the traction cable 60a are connected to the reel 72a and the clutch pulley 54a, respectively. When the motor 56a starts, the speed of the motor 56a is significantly reduced by the gear unit 66a, such that the cam 68a is driven to rotate at a low speed, which in turn drives the rack 70a to perform a reciprocating motion. The reciprocating motion of the rack 70a drives the reel 72a to rotate clockwise or counter-clockwise, such that the traction cable 60a is wound up or released, thereby drives the clutch pulley 54a to move.

In this embodiment, the cam 68a rotates in a counter-clockwise direction as shown in FIG. 15. A rise travel of the boss 80a moving from the contact with a proximal point of the cam 68a to the contact with a distal point of the cam 68a switches the output mechanism to the transmission state, and a return travel of the boss 80a moving from the contact with the distal point of the cam 68a to the contact with the proximal point of the cam 68a switches the output mechanism to the non-transmission state. A profile curve of the cam 68a is configured such that the rise travel of the boss 80a has a relatively slow speed, and the return travel has a relatively fast speed, so as to ensure that the mowing operation is able to be stopped quickly, thereby improving safety.

Specifically, in the return travel of the boss 80a, the rack 70a is moved towards the reel 72a, so as to drive the reel 72a to rotate in a counter-clockwise direction, the traction cable 60a is released outwards, and the clutch pulley 54a is moved to the first position as shown by a solid line in FIG. 10. In the first position, the output mechanism is in the non-transmission state, the clutch pulley 54a is separated from the transmission belt 52a, and the transmission belt 52a is relaxed. In the rise travel of the boss 80a, the rack 70a is moved towards a direction away from the reel 72a, so as to drive the reel 70a to rotate in a clockwise direction, the traction cable 60a is progressively wound up on the reel 70a, such that the clutch pulley 54a is pulled to the second position as shown by the dotted line in FIG. 10. In the second position, the output mechanism is in the transmission state, the clutch pulley 54a abuts against the transmission belt 52a, the transmission belt 52a is tensioned, and the clutch pulley 54a abuts against the transmission belt 52a, thus driving the cutter head 30a to rotate and perform the mowing operation. Preferably, the spring 61a is connected between the traction cable 60a and the clutch pulley 54a to buffer an acting force on the clutch pulley 54a. In addition, the clutch 50a needs to overcome a tensile deformation force of the spring 61a when winding the traction cable 60a on the reel 72a, and a slower winding speed can thus be obtained. When the reel 72a rotates in a counter-clockwise direction and releases the traction cable 60a, a reset force of the spring 61a provides a tensile force, which accelerates the release of the traction cable 60a.

Figure 13:
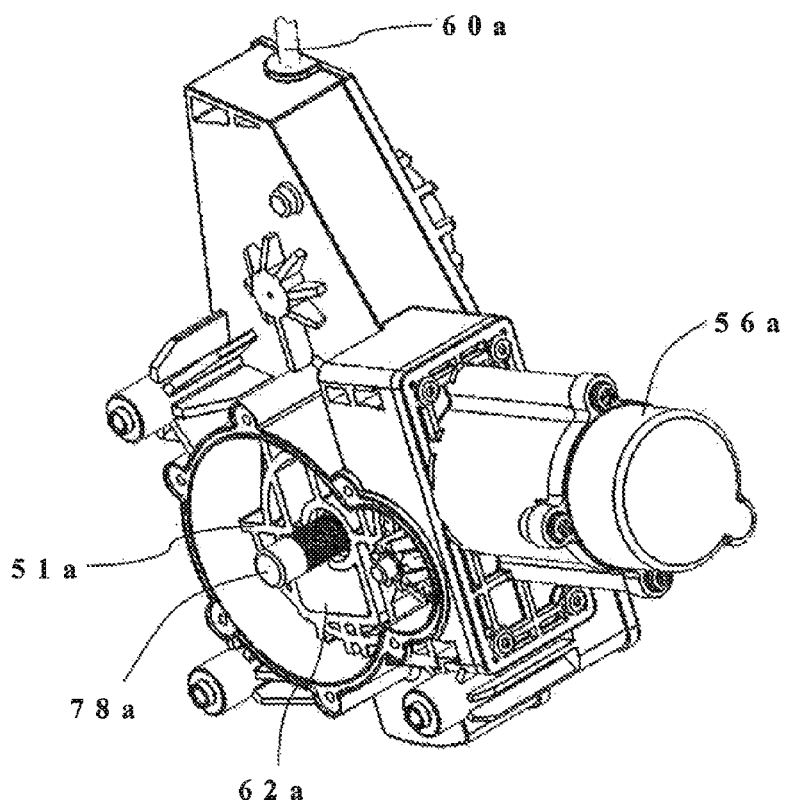
FIG. 13 illustrates the clutch of FIG. 12, in which the output gear is further removed.
Figure 14:
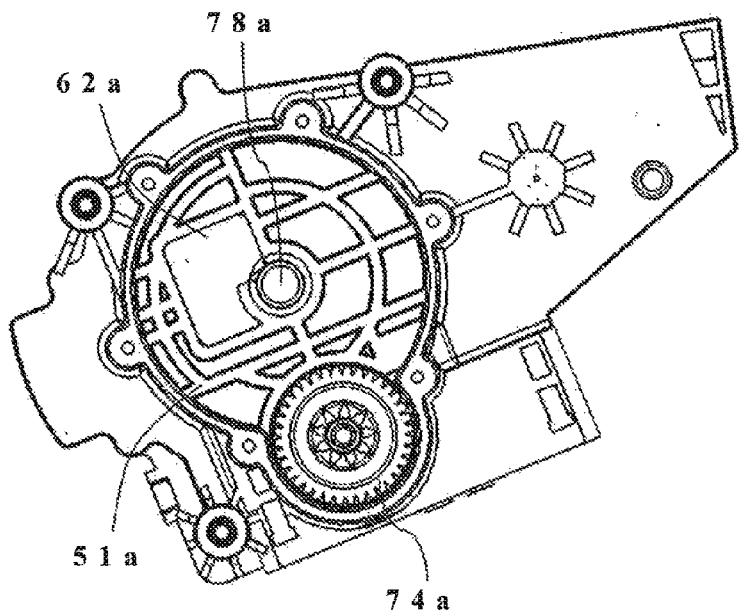
FIG. 14 is a front view of the clutch of FIG. 13, in which the motor is further removed.

Referring to FIG. 13 and FIG. 14, in this embodiment, a mounting plate 51a is formed in a housing of the clutch 50a. The mounting plate 51a divides an interior space of the housing into an upper space and a lower space. The gear unit 66a is located at one side of the mounting plate 51a, and the cam 68a, rack 70a and reel 72a are mounted on the other side of the mounting plate 51a.

Referring also to FIG. 15, the gear unit 66a meshes with the worm 64a and may include multiple intermeshed gears. In this embodiment, the gear unit 66a includes a transmission gear 74a and an output gear 76a. The transmission gear 74a includes a worm wheel 73a and a helical gear 75a that are coaxially connected for synchronous rotation. The worm wheel 73a is meshed with the worm 64a, and the helical gear 75a is meshed with the output gear 76a. The number of teeth of the output gear 76a is far greater than the number of teeth of the helical gear 75a, such that the output speed of the output gear 76a is far less than the output speed of the motor 56a. It can be understood that the transmission gear 74a may also include multiple gears to form a multi-stage transmission for reducing the speed of rotation stage-by-stage. In some embodiments, the transmission gear 74a may also be omitted, in which case the output gear 76a is directly meshed with the worm 64a.

An an output element of the gear unit 66a, the output gear 76a is provided with an output shaft 78a at a center thereof. The output shaft 78a passes through the mounting plate 51a and is then fixedly connected with the cam 68a to drive the cam 68a for synchronous rotation therewith. In this embodiment, the cam 68a overlaps with the rack 70a, an elongated slot 71a is formed in the rack 70a, and a top end of the output shaft 78a is connected with the cam 68a after passing through the slot 71a. The boss 80a is provided at an end of the rack 70a adjacent the cam 68a, an outer surface of the boss 80a contacts an outer edge of the cam 68a, and the other end of the rack 70a is meshed with the reel 72a. The cam 68a interacts with the boss 80a while rotating along with the output shaft 78a, so as to drive the rack 70a to perform the reciprocating linear motion, which in turn drives the reel 72a to rotate clockwise or counter-clockwise.

Referring also to FIG. 13 through FIG. 16, the self-locking mechanism 62a interacts with the reduction transmission mechanism 58a to prevent reverse rotation of the cam 68a. In this embodiment, the self-locking mechanism 62a is disposed between the mounting plate 51a and the output gear 76a to interact with the output shaft 78a of the reduction transmission mechanism 58a. The self-locking mechanism 62a includes a locking pin 82a for engaging with the output shaft 78a, a resilient element 84a resisting the locking pin 82a, and a clamp 86a.

Figure 17:
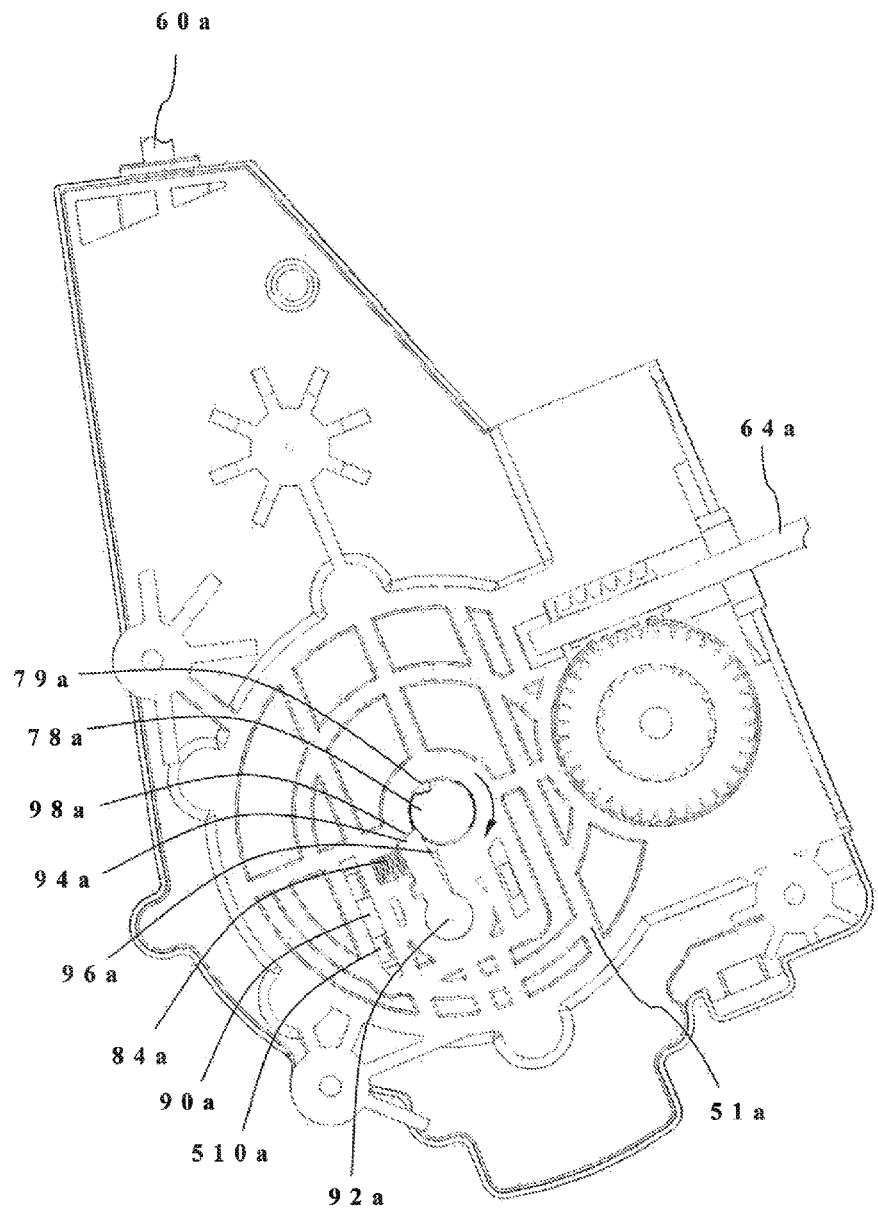
FIG. 17 illustrates the clutch in an initial state.
Figure 18:
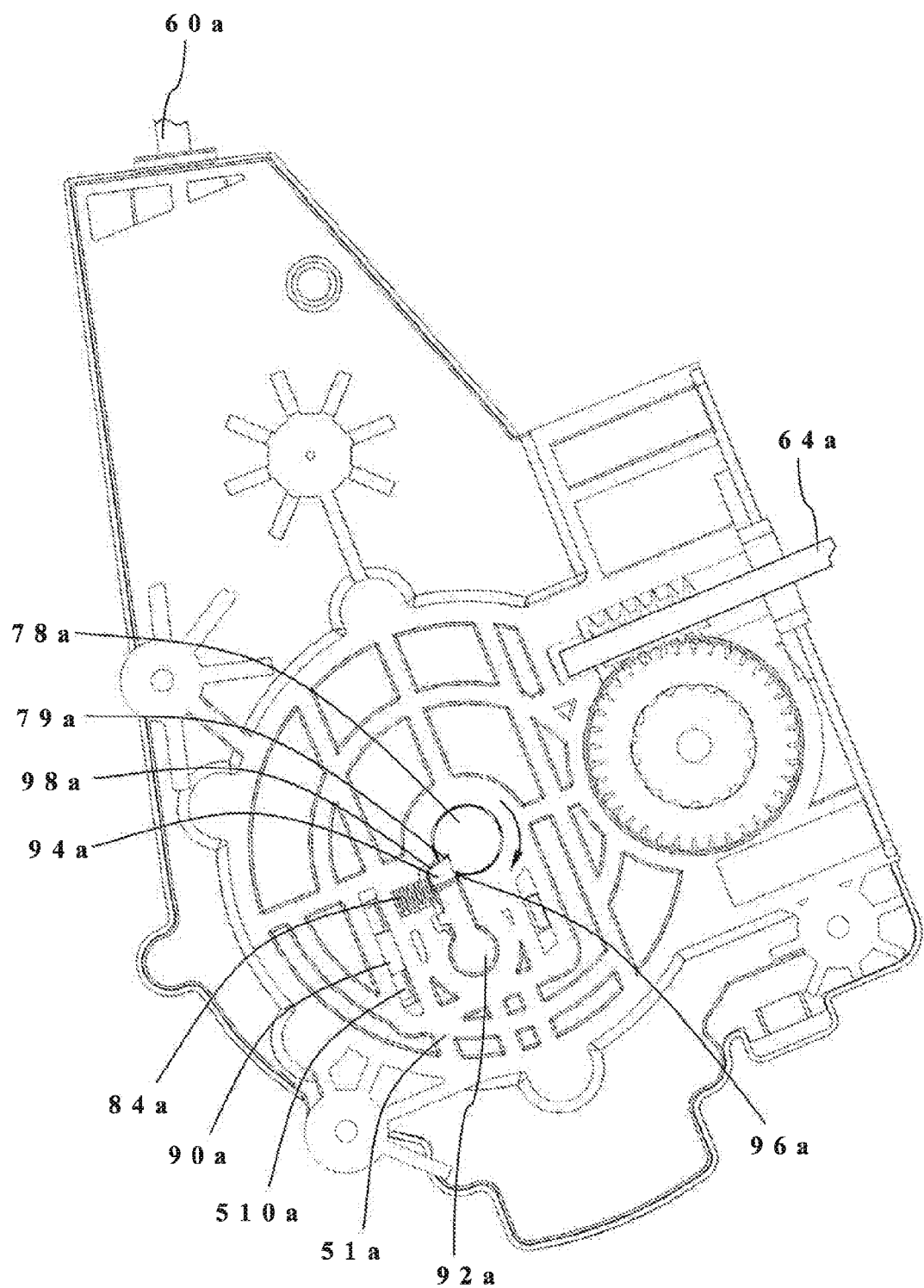
FIG. 18 illustrates the clutch in a transmission state.

The clamp 86a is used to position the self-locking mechanism 62a to the mounting plate 51a, including a base plate 88a and a plurality of barbs 90a extending perpendicularly outwardly from an edge of the base plate 88a. As shown in FIG. 17 and FIG. 18, the mounting plate 51a forms locking holes 510a for engaging with the barbs 90a. In addition, the mounting plate 51a forms a recess for receiving the locking pin 82a and the resilient element 84a. In assembly, the barbs 90a are engaged in their respective locking holes 510a to position the self-locking mechanism 62a on the mounting plate 51a, with the base plate 88a closing an open side of the recess to prevent falling off of the locking pin 82a and resilient element 84a.

In this embodiment, the locking pin 82a is supported on the based plate 88a and extends generally in a tangential direction of the output shaft 78a. One end of the locking pin 82a acts as a positioning end 92a which is round shaped, and the other end is a free end 94a which is disposed between the resilient element 84a and the output shaft 78a. The free end 94a has opposite side surfaces that abut against the output shaft 78a and the resilient element 84a, respectively. The portion of the recess receiving the positioning end 92a of the locking pin 82a has the same shape and size as the positioning end 92a, and the portion of the recess receiving the free end 94a has a greater width than the free end 94a, such that the free end 94a of the locking pin 82a is pivotable in a space within an angle about the positioning end 92a. The resilient element 84a is generally perpendicular to the free end 94a of the locking pin 82a, i.e. the extension and retraction direction of the resilient element 84a is perpendicular to the locking pin 82a, such that the locking pin 82a, when pivoting, compresses or releases the resilient element 84a. Preferably, the resilient element 84a is a spring.

A distance between an outer circumferential surface of the output shaft 78a and the resilient element 84a in the relaxed state is less than the width of the free end 94a of the locking pin 82a. The outer circumferential surface of the output shaft 78a exerts a radial outward force on the side surface 96a of the locking pin 82a to compress the resilient element 84a. As a result, the resilient element 84a exerts a resilient counter-force on the locking pin 82a, such that the locking pin 82a is kept abutting against the output shaft 78a. A notch 79a is formed in the outer circumferential surface of the output shaft 78a. When the output shaft 78a rotates to a position where the notch 79a corresponds to the free end 94a of the locking pin 82a, under the resilient force of the resilient element 84a, the free end 94a of the locking pin 82a pivots into the notch 79a, with two sides of the notch 79a contacting one side surface 96a and an end surface 98a of the free end 94a, as shown in FIG. 18. As the locking pin 82a pivots into the notch 79a, the resilient element 84a releases outwards and returns to its original state.

In this embodiment, the motor 56a drives the output shaft 78a and cam 68a to rotate in the clockwise direction as indicated by the arrow in FIG. 17. The views of FIG. 17 and FIG. 18 and the view of FIG. 15 are from different angles, and in FIG. 17 and FIG. 18, the cam 68a rotates in the clockwise direction as indicated by the arrow under the driving of the motor 56a. During rotation of the output shaft 78a in the clockwise direction, the output shaft 78a constantly exerts the radial outward force on the side surface 96a of the locking pin 82a. The locking pin 82a is pivotably disposed in the tangential direction and, therefore, the rotation of the output shaft 78a drives the locking pin 82a to move such that the output shaft 78a is not stuck. If the motor is powered-off, when the output shaft 78a rotates to the position where the notch 79a corresponds to the locking pin 82a, the locking pin 82a can lock the position of the output shaft 78a although the output shaft 78a is subject to an external counterforce such as the restoration force of the spring 61a that is transmitted through the traction cable 60a.

Specifically, when the mower 100a is not started, the clutch 50a is in an initial state, as shown in FIG. 10 and FIG. 17. At this time, the clutch pulley 54a is in the first position and is not in contact with the transmission belt 52a which is in a relaxed state, the rack 70a of the clutch 50a is near the reel 72a, and the boss 80a on the rack 70a is contacted with the proximal point of the cam 68a, the traction cable 60a is released outwards with a maximum length, and the spring 56a is in a natural state. At this time, the notch 79a of the output shaft 78a is offset an angle from the free end 94a of the locking pin 82a, the free end 94a of the locking pin 82a contacts the outer circumferential surface of the output shaft 78a, and the resilient element 84a is compressed.

When the motor 56a is started, the cam 68a is driven to rotate in a low speed by the output shaft 78a of the gear unit 66a, the contact point of the boss 80a and the cam 68a moves from the proximal point to the distal point, the boss 80a drives the rack 70a away from the reel 72a, which in turn drives the reel 72a to rotate clockwise, and the traction cable 60a is gradually wound up on the reel 72a. The spring 61a is tensioned to drive the clutch pulley 54a to move towards the second position to abut against the transmission belt 59a for tensioning it, such that the power of the engine is transferred to and drive the cutter head 30a to mow. When the boss 80a contacts the distal point of the cam 68a as shown in FIG. 18, the output shaft 78a rotates to the position where the notch 79a corresponds to the free end 94a of the locking pin 82a, and the free end 94a of the locking pin 82a enters the notch 79a under the force of the resilient element 84a.

During the mowing operation, the motor 56a is powered-off, the worm 64a stops rotating which no longer drives the cam 68a to rotate. The locking pin 82a of the self-locking mechanism 62a is engaged in the notch 79a of the output shaft 78a, thereby locking the position of the output shaft 78a. Therefore, after the motor 56a is powered-off, the entire clutch 50a does not operate, the traction cable 60a is always wound on the reel 72a to maintain the clutch pulley 54a in the second position, such that the transmission belt 52a is kept in the tensioned state, thereby maintaining the power transmission between the engine and the cutter head 30a such that the cutter head can continuously perform the mowing operation. After the motor is powered-off, the gear unit 66a itself of the reduction transmission mechanism 58a has the capability of locking the output shaft 78a. In this embodiment, the self-locking mechanism 62a can enhance the self-locking function to improve the reliability of the clutch in case the self-locking force of the gear unit 66a is insufficient to lock the output shaft 78a.

After the mowing operation is completed, as shown in FIG. 10 and FIG. 18, the motor 56a is powered on again to drive the cam 68a to continue to rotate until a complete rotation is made, and the contact point between the cam 68a and the boss 80a moves from the distal point to the proximal point, the rack 70a moves towards the reel 72a reversely, which drives the reel 72a to rotate counter-clockwise and release the traction cable 60a. The clutch pulley 54a is reset to the first position from the second position, and is separated from the transmission belt 52a, so that the power transmission between the engine and the cutter head 30a is disconnected. During this course, as the output shaft 78a rotates, the notch 79a is offset by an angle from the position of the free end 94a of the locking pin 82a, and the whole clutch 50a is returned to the initial state.

The mower 100a of the present invention takes the motor 56a as the power source, which drives the clutch 50a to rotate the reel 72a clockwise and counter-clockwise, which in turn winds or releases the traction cable 60a, which in turn drives the clutch pulley 54a to abut against or move away from the transmission belt 52a. When compared to a hand lever which requires manual operation in the conventional technique, the user operation is simplified and less laborious. In addition, omission of the hand lever makes the appearance of the mower 100a more aesthetic. In addition, through the interaction between the locking pin 82a of the self-locking mechanism 62a and the notch 79a of the output shaft 78a and by taking advantages of the different forces the output shaft 78a acts on the locking pin 82 when rotating in different directions, reverse rotation of the reduction transmission mechanism 58a is securely prevented. Therefore, this prevents the change of the state of the clutch 50a after the motor 56a is powered-off or under the influence of external forces that would cause unstable transmission or even racing of the engine which affect the use of the machine and causes a waste of energy.

FIG. 19 through FIG. 28 illustrate a mower according to a third embodiment of the present invention.

Figure 19:
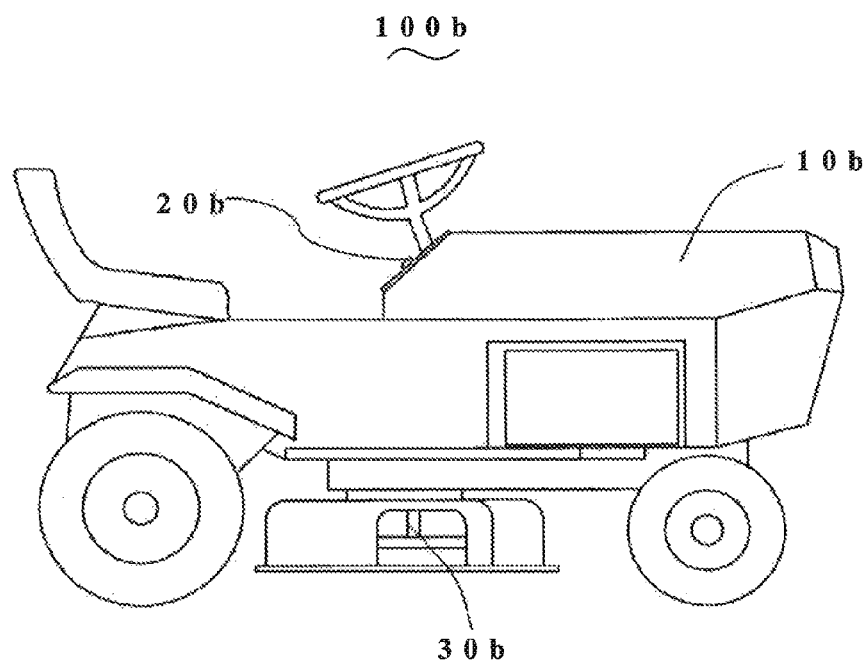
FIG. 19 is a schematic view of a mower according to a third embodiment of the present invention.
Figure 20:
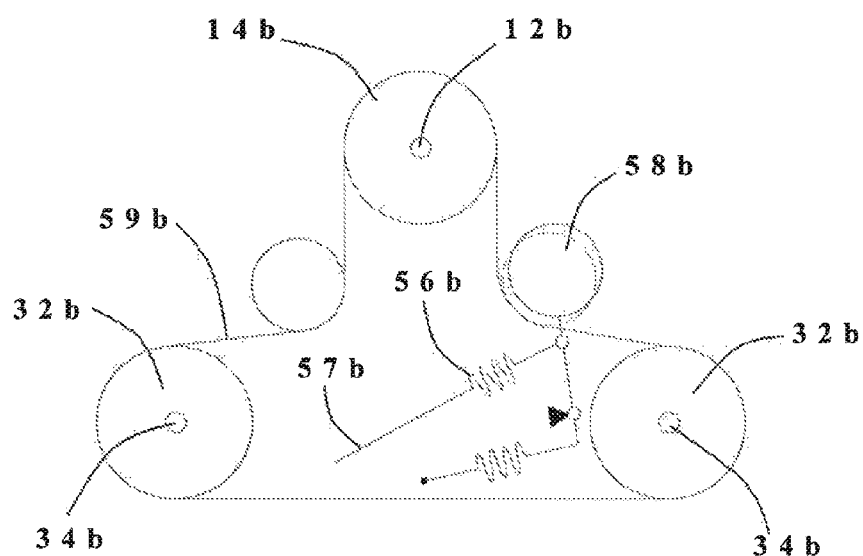
FIG. 20 is a schematic view of a transmission of the mower of FIG. 19.

As shown in FIG. 19 and FIG. 20, a mower 100b of the third embodiment of the present invention comprises a housing 10, an engine (not shown in the figure) provided inside the housing 10b, a cutter head 30b, and a clutch 50b transmitted between the engine and the cutter head 30b.

Figure 21:
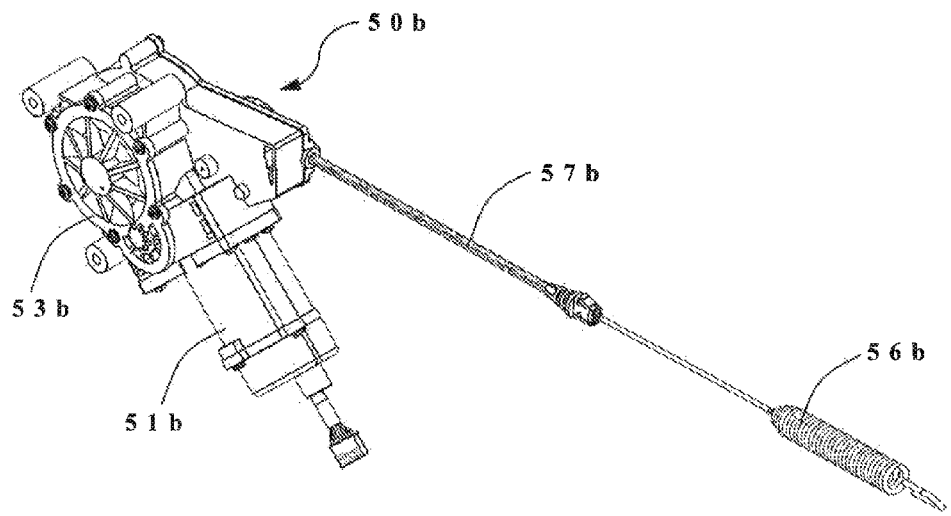
FIG. 21 is a view of a clutch of the mower of FIG. 19.

A rotating shaft 12b of the engine fixedly connects a driving pulley 14b thereon. There may be a single cutter head 30b or a plurality of cutter heads 30b, and the mower 100b of the embodiment has two cutter heads 30b. Each cutter head 30b is fixedly connected onto a mandrel 34b of a driven pulley 32b. Referring also to FIG. 21, the clutch 50b comprises a motor 51b, a reduction transmission mechanism 53b driven by the motor 51b, a gang switch 55b controlled by the reduction transmission mechanism 53b, a traction cable 57b, a clutch pulley 58b, and a transmission belt 59b. The transmission belt 59b is mounted on the driving pulley 14b and the two driven pulleys 32b, which can transfer the power between the engine and the cutter head 30b.

The motor 51b, which serves as a power source of the whole clutch 50b, is preferably a permanent magnet DC motor. A button 20b (see FIG. 19) may be provided on a housing 10b of the mower 100b for controlling power-on or power-off of the motor 51b. The reduction transmission mechanism 53b is pivotably connected with a rotor of the motor 51b, such that the rotation of the motor 51b is outputted after being decelerated. Opposite ends of the traction cable 57b are connected with the speed reduction mechanism 53b and clutch pulley 58b, and the speed reduction mechanism 53b, while operating, causes the traction cable 57b to be wound up or released, which drives the clutch pulley to switch between a first position and a second position. The gang switch 55b is connected to the motor 10b through a power cable.

Specifically, when the speed reduction mechanism 53b drives the clutch pulley 58b to move to the first position as shown by a solid line in FIG. 20, the clutch pulley 58b is separated from the transmission belt 59b, and the transmission belt 59b is relaxed, which does not transmit the power of the engine to the cutter head 30b. When the speed reduction mechanism 53b drives the clutch pulley 58b to move to the second position as shown by a dotted line in FIG. 20, the clutch pulley 58b abuts against the transmission belt 59b and the transmission belt 59b is tensioned to transfer the power of the engine to the cutter head 30b, which drives the cutter head 30b to rotate and perform the mowing operation.

Figure 22:
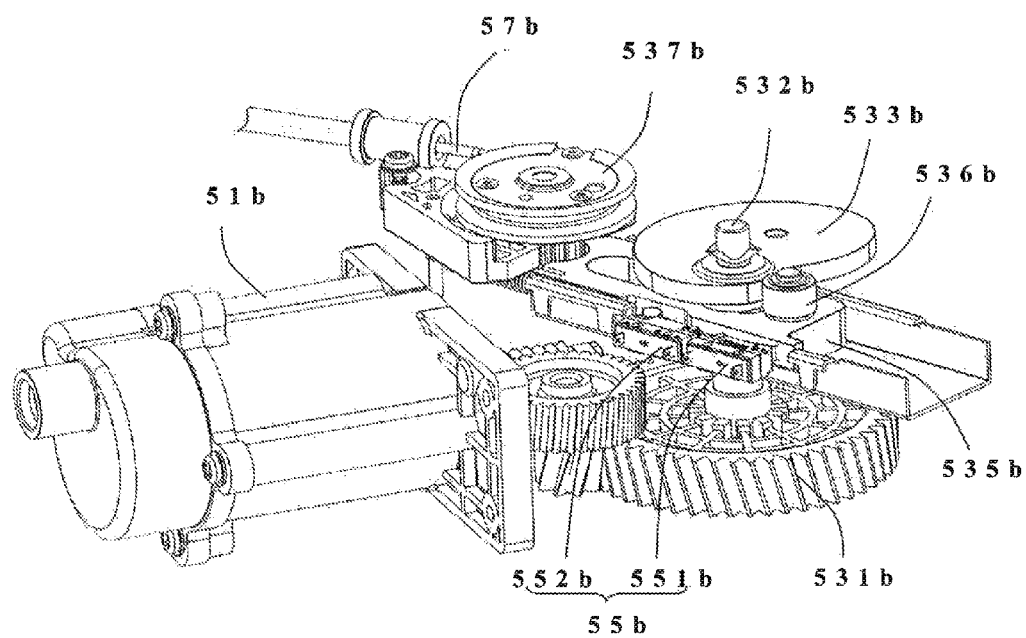
FIG. 22 is a view of the clutch of FIG. 21 from another angle, with a portion of housing removed.
Figure 23:
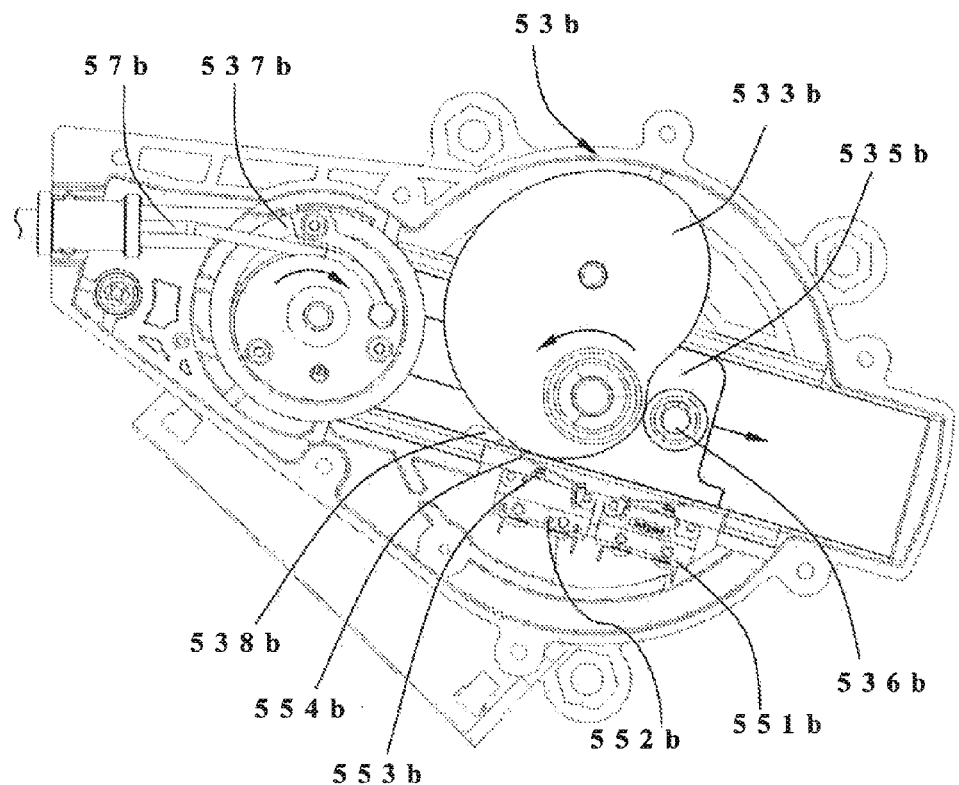
FIG. 23 illustrates the clutch of FIG. 21 in an initial state.

Referring also to FIG. 22 and FIG. 23, the reduction transmission mechanism 53b comprises a gear unit 531b, a cam 533b driven by the gear unit 531b, a cam follower (a boss in this embodiment) 536b interacting with the cam 533b, and a rack 535b fixed with the boss 536b, and a reel 537b meshed with the rack 535b.

The gear unit 531b is connected with the motor 51b and may comprise a plurality of intermeshing gears, so as to decelerate the high-speed rotation of the motor 51b. The gear unit 531b has an output shaft 532b which has a relatively low output rotation speed after being decelerated. The cam 533b overlaps on the rack 535b, and a top of the output shaft 532b is fixedly connected with the cam 533b after passing through the rack 535b. The boss 536b is provided at an end of the rack 535b, and an outer surface of the boss 536b is contacted with an outer edge of the cam 533b. The other end of the rack 535b is meshed with the reel 537b, and the cam 533b when rotating interacts with the boss 536b, so as to drive the boss 536b to urge the rack 535b to perform a reciprocating linear motion, which in turn drives the reel 557b to rotate clockwise or counter-clockwise.

In the present embodiment, the gear unit 531b drives the cam 533b to rotate in a counter-clockwise direction as shown in FIG. 23. The profile of the cam 533b is designed such that the movement (also referred to as a rise travel) of the boss 536b away from the reel 537b has a relatively slow speed, and the movement (also referred to as a return travel) of the boss 536b toward the reel 537b has a relatively fast speed, so as to ensure that the mowing operation can be stopped quickly, thereby improving safety. When the rack 535b moves away from the reel 537b, the reel 537b rotates clockwise, the traction cable 57b is wound on the reel 537b, which drives the clutch pulley 58b to the second position to abut against the transmission belt 59b. On the contrary, when the cam 533b drives the rack 535b toward the reel 537b, the reel 537b rotates counter-clockwise, the traction cable 57b is released outwards, which allows the clutch pulley 58b to be separated from the transmission belt 59b and return to the first position. Preferably, a spring 56b is connected between the traction cable 57b and the clutch pulley 58b to buffer an acting force on the clutch pulley 58b. In addition, the spring 56b experiences a tensile deformation when the clutch 50b operates to wind the traction cable 57b on the reel 537b, and when the reel 537b rotates counter-clockwise to release the traction cable 57b, a reset force of the spring 56b provides a tensile force, which accelerates the release of the traction cable 57b.

Figure 24:
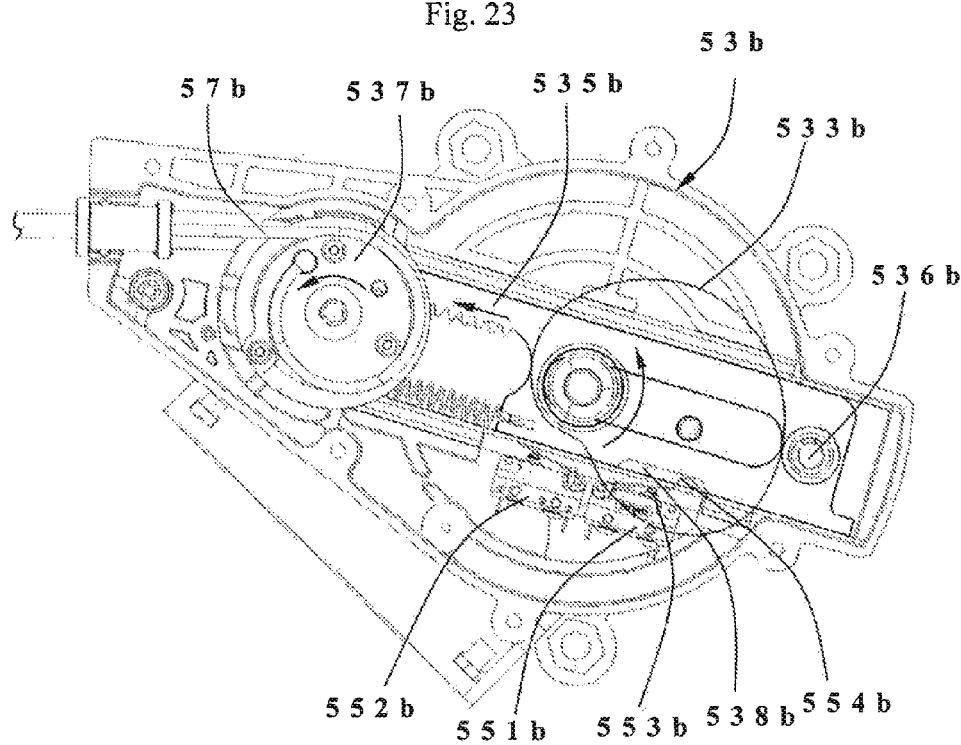
FIG. 24 illustrates the clutch of FIG. 21 in a transmission state.

Referring also to FIG. 23 and FIG. 24, the gang switch 55b is fixedly mounted inside an outer housing of the clutch 50b, corresponding to the speed reduction mechanism 53b. During operation of the speed reduction mechanism 53b, due to the change in the position of the speed reduction mechanism 53b itself, the gang switch 55b is turned on or off, thereby automatically controlling turn-on or turn-off of the motor 51.

In this embodiment, the gang switch 55b includes a first switch 551b and a second switch 552b. The two switches 551b and 552b are disposed side by side in a transverse direction and face a side surface of the rack 535b. The second switch 552b is closer to the reel 537b, and the first switch 551b is farther from the reel 537b. Each of the two switches 551b, 552b is provided with a button 553b and a resilient tab 554b on its inner surface facing the rack 535b. The button 553b is generally located at a middle of the inner surface of the switch 551b, 552b. The resilient tab 554b extends outwardly and obliquely from the inner surface of the switch 551b, 552b toward the rack 535b. An outwardly extending width of the resilient tab 554b in its natural state is greater than a distance between the switch 551b, 552b and the rack 535b.

Corresponding to the gang switch 55b, the rack 535b forms a groove 538b on its side surface facing the switches 551b, 552b. When the speed reduction mechanism 53b operates under the driving of the motor 51b, the rack 535b moves back and forth and slides relative to the gang switch 55b, such that the resilient tabs 554b of the switches 551b, 552b can slide into or out of the groove 538b of the rack 535b. In this embodiment, the two switches 551b and 552b are normally open switches, i.e. the switch is turned off when the button 553b is not pressed and is closed to turn on when the button 553b is pressed. That is, when located in the groove 538b, the resilient tab 554b is in the natural state and exerts no force on the button 553b, such that the switches 551b, 552b are opened; when located outside the groove 538b, the resilient tab 554b is compressed to depress one corresponding button 553b, such that the corresponding switch 551b, 552b is closed.

Figure 25:
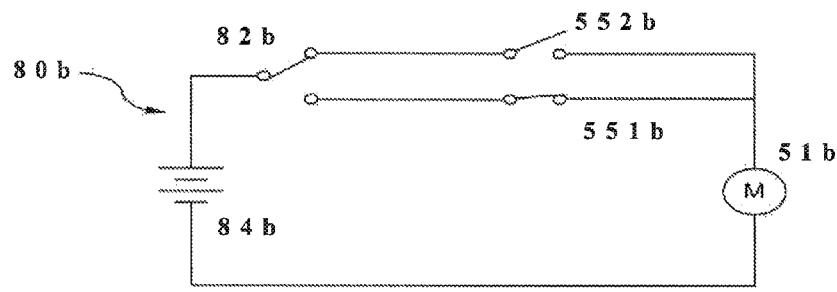
FIG. 25 is a circuit diagram of a control circuit of the clutch of FIG. 21.

As shown in FIG. 25, the two switches 551b, 552b are connected with the motor 51b to form two branches. A control switch 82b selectively connects the first switch 551b or the second switch 552b with a power source 84b, which forms a control circuit for controlling power-on or power-off of the motor 51b. The control switch 82b is disposed outside the clutch 50b and can be connected with the button 20b on the housing 10b, such that the control switch 82b can be conveniently controlled to connect the first switch 551b or the second switch 552b with the power source 84b by pressing the button 20b. When the mower is not performing the mowing operation, the clutch 50b is in an initial state, and the control switch 82b connects the power source 84b to the second switch 552b, and the first switch 551b is shut off from the power source 84b.

At this time, as shown in FIG. 20 and FIG. 23, the clutch pulley 58b is in the first position and is not in contact with the transmission belt 59b which is in a relaxed state, the rack 535b of the clutch 50b is near the reel 537b, and the boss 536b on the rack 535b is contacted with the proximal point of the cam 533b, the traction cable 57b is released outwards with a maximum length, and the spring 56b is in the natural state. At this time, the groove 538b of the rack 535b is aligned with the second switch 552b, a distal end of the resilient tab 554b of the second switch 552b is located in the groove 538b and the resilient tab 554b straightens naturally, and the second switch 552b is turned off. The first switch 551b is offset a distance from the groove 538b, the resilient tab 554b of the first switch 551b is compressed by the rack 535b to deform to press the button 553b of the first switch 551b, such that the first switch is closed, and the motor 51b is not powered on.

When there is a need to start mowing, the button 20b is depressed such that the control switch 82b is switched to connect the power source 84b with the first switch 551b, while disconnecting the power source 84b with the second switch 552b. At this time, because the first switch 551b is in the closed state, the motor 51b is powered on, the cam 533b is driven to rotate in a low speed by the reel 537b, the contact point of the boss 536b and the cam 533b moves from the proximal point to the distal point, which drives the rack 535b to move away from the reel 537b and drives the reel 537b to rotate clockwise, the traction cable 55b is gradually wound up on the reel 537b, the spring 56b is tensioned to drive the clutch pulley 58b to move towards the second position to abut against the transmission belt 59b for tensioning it, and the power of the engine 10b can thus be transferred to the cutter head 30b via the transmission belt 59b, so as to drive the cutter head 30b.

During the above course, as the rack 535b moves away from the reel 537b, the resilient tab 554b of the second switch 552b slides out of the groove 538b to press the button 553b of the second switch 552b, thus making the second switch 552b close. During closing of the second switch 552b, the resilient tab 554b of the first switch 551b slides into the groove 538b. As such, the force that the resilient tab 554b exerts on the button 553b of the first switch 551b decreases gradually till the button 553b of the first switch 551b is reset. At this time, the first switch 551b is shut off, and the motor 51b is powered off. That is, when the motor 51b drives the clutch pulley 58b to abut against the transmission belt 59b, the motor 51b is automatically powered off.

After the motor 51b is powered-off, the clutch 50b is locked in the current state by a self-locking mechanism (not shown in this embodiment, and an illustrative construction of the self-locking mechanism is described in the second embodiment with reference to FIG. 9 to FIG. 18 above), the reel 537b keeps the traction cable 57b in the retracted state, and the transmission belt 59b keeps tensioning, thereby allowing the engine to drive the cutter head 30b to rotate continuously to perform the mowing operation. The first switch 551b and the second switch 552b are kept in the opened state and the closed state, respectively. In embodiments of the present invention, the self-locking mechanism can be a one-way clutch part, which allows the cam 536b to rotate counter-clockwise, but prevents it from rotating clockwise. The self-locking mechanism for example can be arranged between the output shaft 532b of the speed reduction mechanism 53b and the gear fixed to the output shaft 532b. It can be appreciated that the self-locking mechanism can also be achieved by adopting other suitable structures which can lock the clutch 50b in the current state, and can also be arranged at other suitable positions.

When there is a need to stop the mowing operation, the control switch 82b switches to connect the power source 84b to the second switch 552b, and the first switch 551b is disconnected from the power source 84b. At this time, the second switch 552b is in a closed state, the motor 51b is powered on, the cam 533b continues to rotate under the driving of the motor 51b, and the contact point between the cam 533b and the boss 536b moves from the distal point to the proximal point, the rack 535b moves reversely towards the reel 537b, which drives the reel 537b to rotate counter-clockwise and releases the traction cable 57b outwards. The clutch pulley 58b is reset to the first position from the second position, and is separated from the transmission belt 59b, so that the power transmission between the engine 10b and the cutter head 30b is disconnected. During reverse movement of the rack 535b, the resilient tab 551b of the first switch 551b moves away from the groove 538b, the button 553b of the second switch 552b is reset, the second switch 552b is opened, the motor 51b is power off, and the whole clutch 50b is returned to its initial state.

Figure 26:
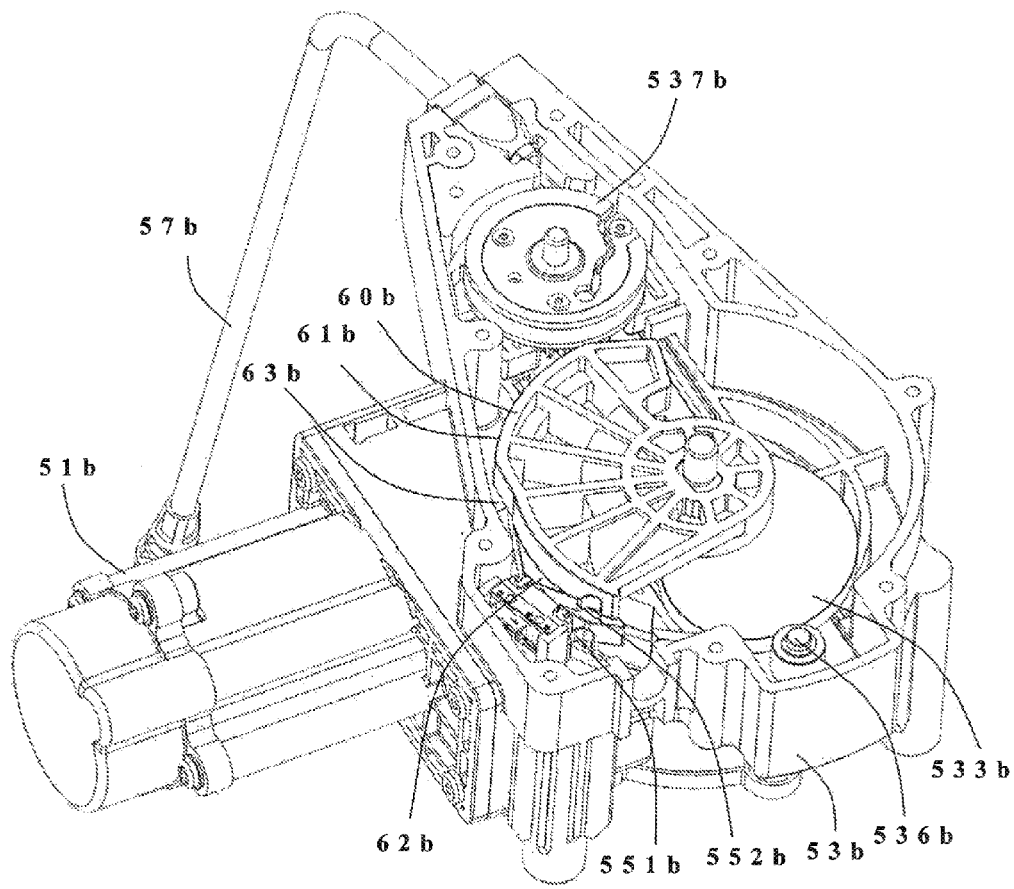
FIG. 26 illustrates a clutch according to another embodiment.
Figure 27:
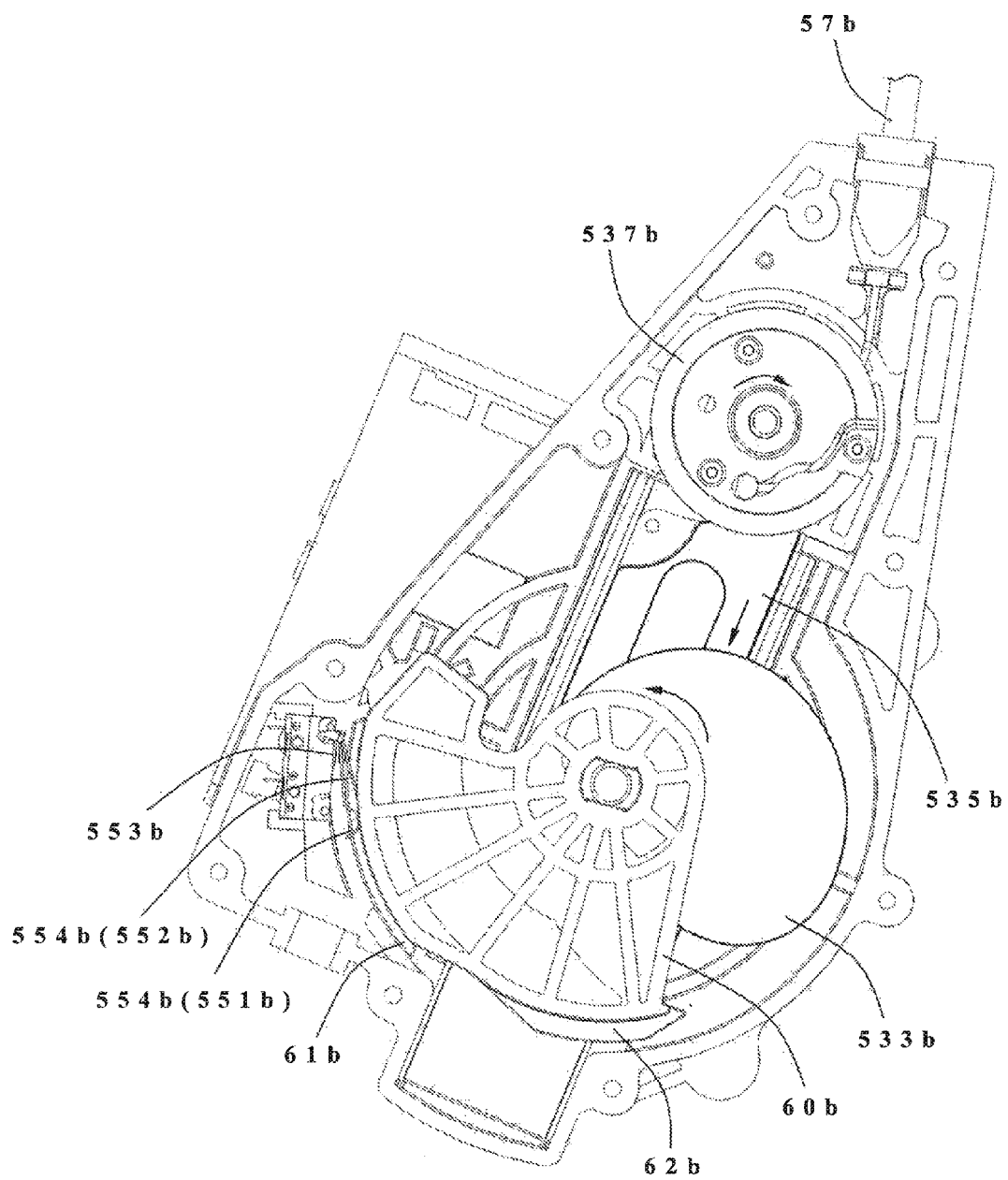
FIG. 27 illustrates the clutch of FIG. 26 in the initial state.
Figure 28:
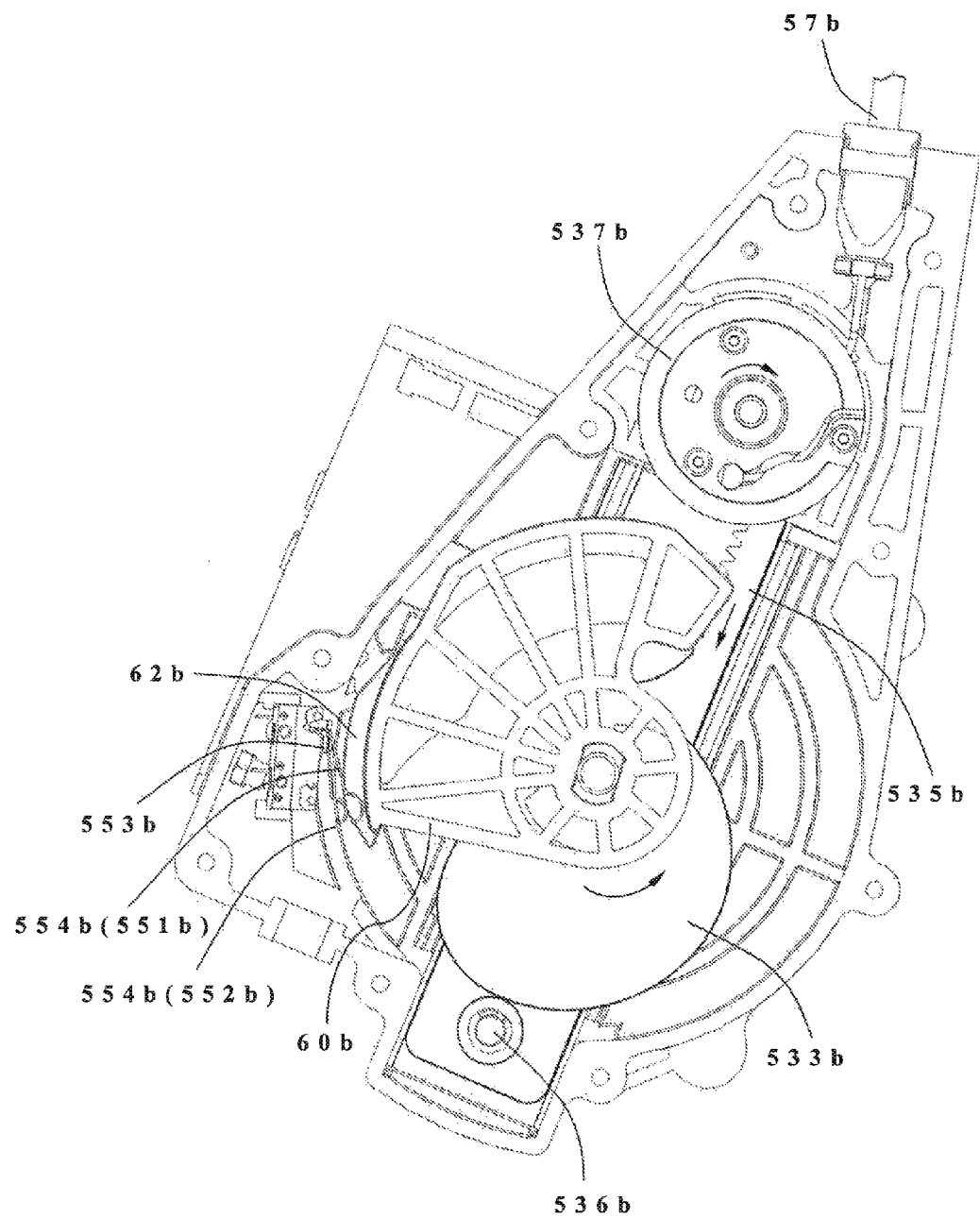
FIG. 28 illustrates the clutch of FIG. 26 in the transmission state.

FIG. 26 through FIG. 28 illustrate another embodiment of the clutch 50b, the difference of which lies in the gang switch 55b and the speed reduction mechanism 53b. In this embodiment, the gang switch 55b is fixed inside the outer housing of the clutch 50b, disposed at one side of the rack 535b but spaced from the rack 535b. A top end of the output shaft 532b is mounted with a driving block 60b which rotates in synchronous with the output shaft 532b. The gang switch 55b is located on a rotation path of the driving block 60b, and the driving block 60b, while rotating, interacts with the gang switch 55b.

The two switches 551b, 552b of the gang switch 55b are arranged axially in parallel, with the second switch 552b located above the first switch 551b. The resilient tab 554b of each switch 551b, 552b extends obliquely toward an outer circumferential surface 61b of the driving block 60b. An outwardly extending width of the resilient tab 554b in its natural state is greater than a radial distance between the switch 551b, 552b and the outer circumferential surface 61b of the driving block 60b, such that the driving block 60b, while rotating, exerts an outward force on the resilient tab 554b, making the resilient tab 554b deform to press the button 553b of the switch 551b, 552b. The two switches 551b, 552b of the present embodiment can likewise form the control circuit 80b as illustrated in FIG. 25. Alternatively, the two switches 551b and 552b of this embodiment are normally closed switches, i.e. when the button 553b is not pressed, the switch 551b, 552b are closed to turn on; when the button 553b is pressed, the switch 551b, 552b is turned off.

The driving block 60b forms two grooves, i.e. a first groove 62b and a second groove 63b, on its outer circumferential surface 61b, corresponding to the two switches 51b, 552b. The first groove 62b corresponds to the second switch 552b, and the second groove 63b corresponds to the first switch 551b. In the axial direction, the first groove 62b is located above the second groove 63b; in the circumferential direction, the first groove 62b is located ahead of the second groove 63b in the counter-clockwise direction. The two grooves 62b, 63b are offset from each other both in the axial and circumferential directions. When the clutch 50b is in the initial state, the control switch 82b connects the power source 84b with the second switch 52b, and disconnects the first switch 551b from the power source 84b.

At this time, as shown in FIG. 27, the boss 536b of the rack 535b contacts the proximal point of the cam 533b, the traction cable 57b is released outwards with a maximum length, the clutch pulley 58b is in the first position, the transmission belt 59b is in a relaxed state. At this time, the portion of the driving block 60b that forms the first groove 62b is radially aligned with the proximal point of the cam 533b, the second groove 63b is aligned with the gang switch 55b, the resilient tab 554b of the second switch 552b is compressed by the driving block 60b to deform to press the button 553b of the second switch 552b, such that the second switch 552b is turned off; the resilient tab 554b of the first switch 551b straightens naturally, with its distal end located in the second groove 63b, the first switch is kept closed, and the motor 51b is not powered on.

When there is a need to start mowing, the control switch 82b is switched to disconnect the power source 84b from the second switch 552b and connect the power source 84b with the first switch 551b. At this time, the first switch 551b is in the closed state and, therefore, the motor 51b is powered on to drive the cam 533b and driving block 60b for synchronous rotation. The rotating cam 533b pushes the rack 535b away from the reel 537b, which drives the reel 537b to rotate to retract the traction cable 57b, which in turn drives the clutch pulley 58b to move to the second position to abut against the transmission belt 59b. As the driving block 60b rotates, the portion of the driving block 60b that forms the second groove 63b moves away from the gang switch 55b, and the portion that forms the first groove 62*b* rotates to align with the gang switch 55*b*, as shown in FIG. 28. During this course, the resilient tab 554*b* of the first switch 551*b* exits the second groove 63*b* and deforms under the compressing of the driving block 60*b* to press the button 553*b* of the first switch 551*b*, such that the first switch 551*b* is disconnected, and the motor 51*b* is powered off. Simultaneously, the resilient tab 554*b* of the second switch 552*b* enters the first groove 62*b* and returns to its original state, the button 553*b* of the second switch 552*b* is reset, and the second switch 552*b* is closed.

After the motor 51*b* is powered off, the clutch is locked in the current state by a self-locking mechanism (not shown in this embodiment, and an illustrative construction of the self-locking mechanism is described in the second embodiment with reference to FIG. 9 to FIG. 18 above), the reel 537*b* keeps the traction cable 57*b* in the retracted state, and the transmission belt 59*b* keeps tensioning, thereby allowing the engine to drive the cutter head 30*b* to rotate continuously to perform the mowing operation. The first switch 551*b* and the second switch 552*b* are kept in the opened state and the closed state, respectively.

When there is a need to stop the mowing operation, the control switch 82*b* switches to connect the power source 84*b* to the second switch 552*b*, the first switch 551*b* is disconnected from the power source 84*b*. At this time, the second switch 552*b* is in a closed state, the motor 51*b* is powered on, the cam 533*b* and the driving block 60*b* continues to rotate under the driving of the motor 51*b*, the rotation of the cam 533*b* drives the rack to move toward the reel 537*b*, which drives the reel 537*b* to rotate counter-clockwise to release the traction cable 57*b* outwards. The clutch pulley 58*b* is reset to the first position from the second position, and is separated from the transmission belt 59*b*, so that the cutter head 30*b* stops rotating. The rotation of the driving block 60*b* causes the resilient tab 554*b* of the first switch 551*b* to slide into the second groove 63*b* and return to its original state, the button 553*b* of the first switch 552*b* is reset, so that the first switch 552*b* is closed. Simultaneously, the resilient tab 554*b* of the second switch 552*b* exits the first groove 62*b* and presses the button 553*b* of the second switch 552*b*, the second switch 552*b* is opened, the motor 51*b* is powered off, and the whole clutch 50*b* is returned to its initial state, as shown in FIG. 28.

The mower 100*b* of the present invention takes the motor 51*b* as the power source, clockwise and counter-clockwise rotations of the reel 537*b* are realized by the engagement between the cam 533*b* and rack 535*b* of the clutch 50*b*, which winds or releases the traction cable 57*b*, which in turn drives the clutch pulley 58*b* to abut against or move away from the transmission belt 59*b*. When compared to a hand lever which requires manual operation in the conventional technique, the user operation is simplified and less laborious. In addition, omission of the hand lever makes the appearance of the mower 100*b* more aesthetic. In addition, by forming the grooves 538*b*, 62*b*, 63*b* on the rack 535*b* and driving block 60*b* of the speed reduction mechanism 535*b* and by taking advantages of the change in the positions of the grooves 538*b*, 62*b*, 63*b* as a result of the movement of the rack 535*b* or rotation of the driving block 60*b* during operation of the speed reduction mechanism 53*b*, the resilient tabs 554*b* of the two switches 551*b*, 552*b* of the gang switch 55*b* are pressed or released to control the power state of the motor 51*b*, thereby controlling the mowing operation.

Figure 29:
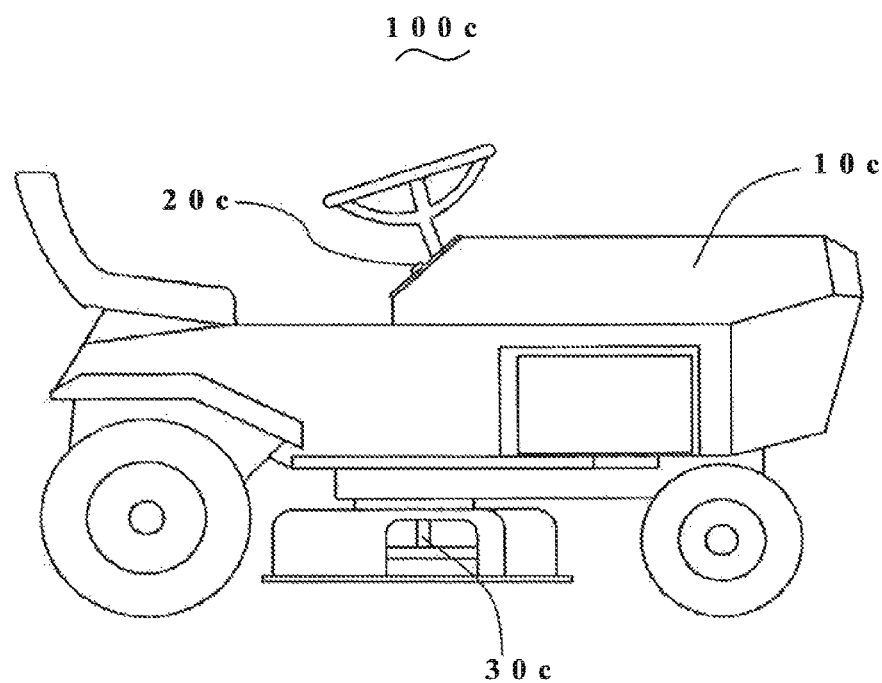
FIG. 29 is a schematic view of a mower according to a fourth embodiment of the present invention.
Figure 36:
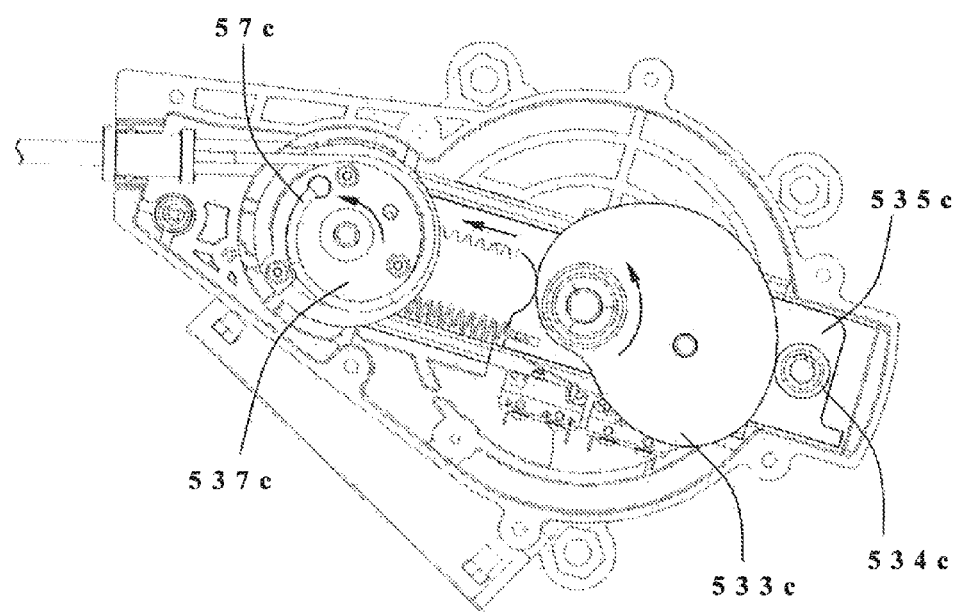
FIG. 36 illustrates the clutch of FIG. 31 in a transmission state.

FIG. 29. through FIG. 36 illustrate a mower according to a fourth embodiment of the present invention.

Figure 30:
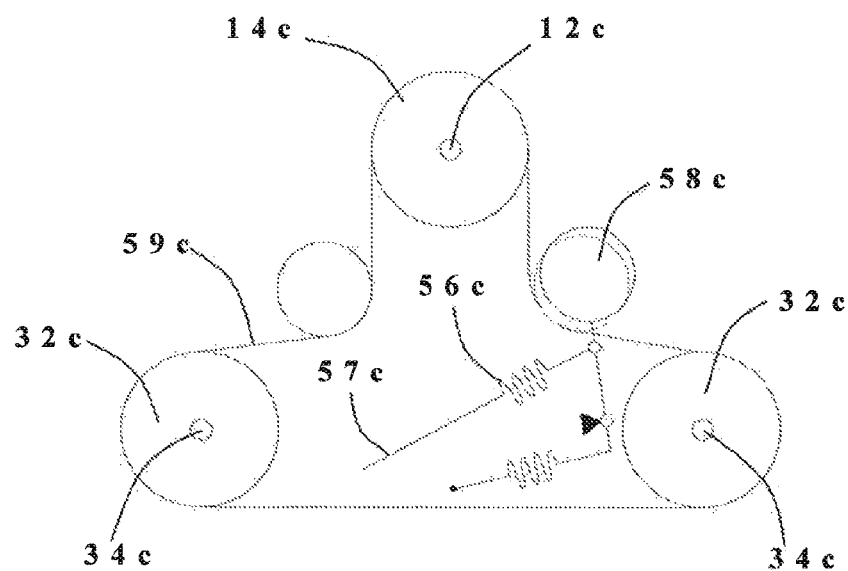
FIG. 30 is a schematic view of a transmission of the mower of FIG. 29.

As shown in FIG. 29 to FIG. 30, a mower 100*c* of the fourth embodiment of the present invention comprises a housing 10*c*, an engine (not shown in the figure) provided inside the housing 10*c*, a cutter head 30*c*, and a clutch 50*c* transmitted between the engine and the cutter head 30*c*.

Figure 31:
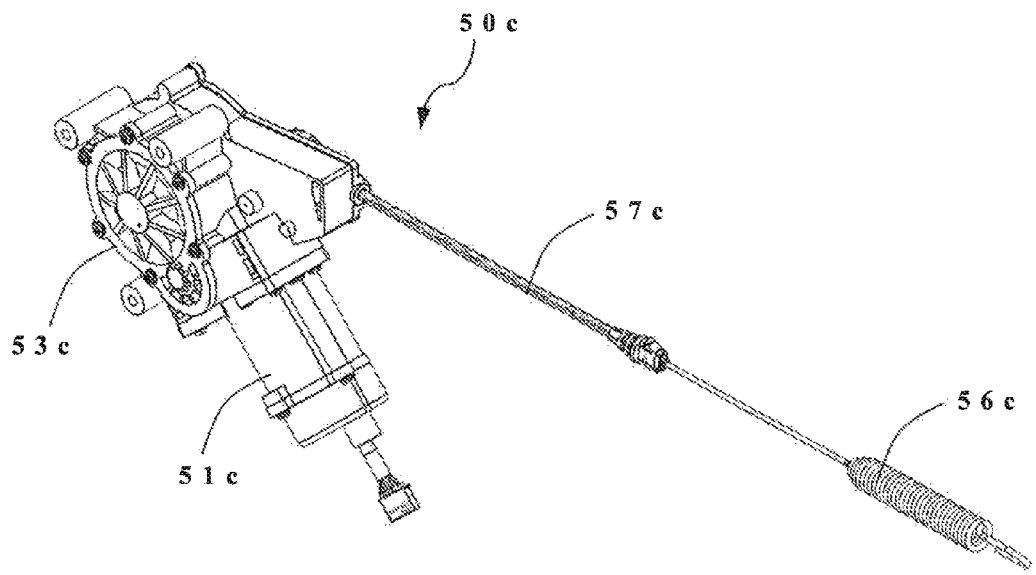
FIG. 31 is a view of a clutch of the mower of FIG. 29.

A rotating shaft 12*c* of the engine fixedly connects a driving pulley 14*c* thereon. There may be a single cutter head 30*c* or a plurality of cutter heads 30*c*, and the mower 100*c* of the embodiment has two cutter heads 30*c*. Each cutter head 30*c* is fixedly connected onto a mandrel 34*c* of a driven pulley 32*c*. Referring also to FIG. 31, the clutch 50*c* comprises a motor 51*c*, a transmission unit 53*c* connected with the motor 51*c*, an electric switch controlled by the transmission unit 53*c*, a traction cable 57*c*, a clutch pulley 58*c*, and a transmission belt 59*c*. The transmission belt 59*c* is mounted on the driving pulley 14*c* and the two driven pulleys 32*c*, which can transfer the power between the engine and the cutter head 30*c*.

The motor 51*c*, which serves as a power source of the whole clutch 50*c*, is preferably a permanent magnet DC motor. A button 20*c* (see FIG. 29) may be provided on the housing 10*c* of the mower 100*c*, the button 20*c* is connected with an electric switch, and the motor 10*c* is connected to the electric switch through a power cable. Therefore, power-on or power-off of the motor 51*c* is controlled by the button 20*c* and the electric switch 55*c*. The transmission unit 53*c* is pivotably connected with a rotor of the motor 51*c*, such that the rotation of the motor 51*c* is outputted after being decelerated. Opposite ends of the traction cable 57*c* are connected with the transmission unit 53*c* and clutch pulley 58*c*, and the transmission unit 53*c*, while operating, causes the traction cable 57*c* to be wound up or released, which drives the clutch pulley 58*c* to switch between a first position and a second position.

Specifically, when the clutch pulley 58*c* moves to the first position as shown by a solid line in FIG. 30, the clutch pulley 58*c* is separated from the transmission belt 59*c*, and the transmission belt 59*c* is relaxed, which does not transmit the power of the engine to the cutter head 30*c*. When the clutch pulley 58*c* moves to the second position as shown by a dotted line in FIG. 30, the clutch pulley 58*c* abuts against the transmission belt 59*c* and the transmission belt 59*c* is tensioned to transfer the power of the engine to the cutter head 30*c*, which drives the cutter head 30*c* to rotate and perform the mowing operation.

Figure 32:
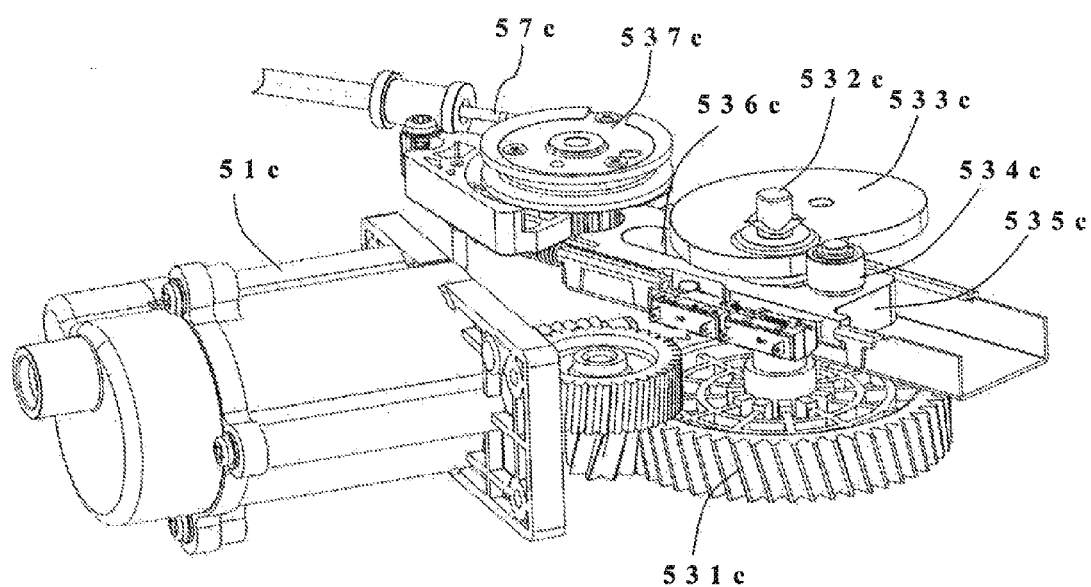
FIG. 32 is a view of the clutch of FIG. 31 from another angle, with a portion of housing removed.

Referring also to FIG. 32, the transmission unit 53*c* comprises a gear unit 531*c*, a cam 533*c* driven by the gear unit 531*c*, a cam follower (a boss in this embodiment) 534*c* interacting with the cam 533*c*, a rack 535*c* connected with the boss 534*c*, and a reel 537*c* meshed with the rack 535*c*.

Figure 33:
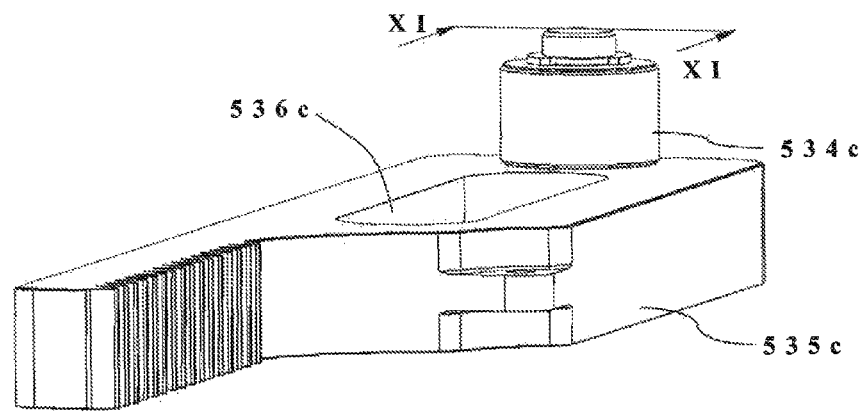
FIG. 33 is an assembled view of a rack and follower of the clutch of FIG. 31.
Figure 34:
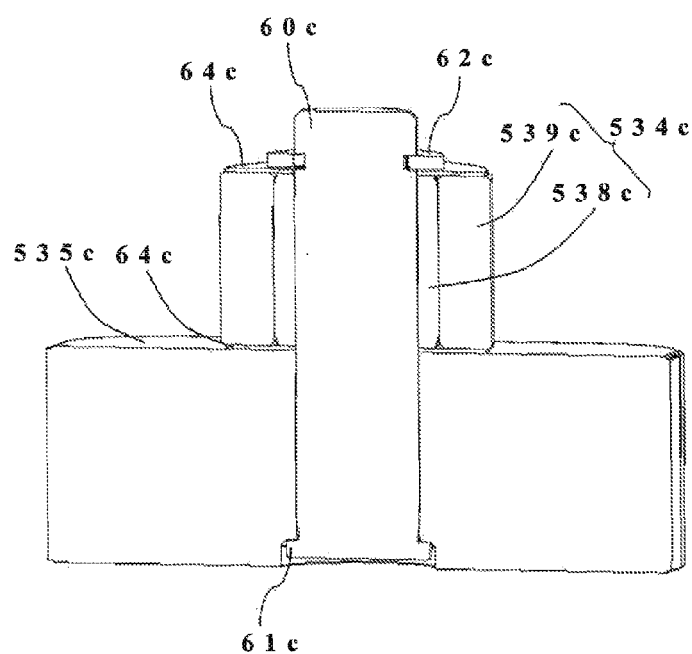
FIG. 34 is a sectional view of FIG. 33 taken along line XI-XI thereof.

The gear unit 531*c* is connected with the motor 51*c* and may comprise a plurality of intermeshing gears, so as to decelerate the high-speed rotation of the motor 51*c*. The gear unit 531*c* has an output shaft 532*c* which has a relatively low output rotation speed after being decelerated. The cam 533*c* overlaps on the rack 535*c*, an elongated slot 536*c* is formed in the rack 535*c*, and a top of the output shaft 532*c* is fixedly connected with the cam 533*c* after passing through the slot 536*c* of the rack 535*c*. As shown in FIG. 33 and FIG. 34, in this embodiment, a pivot axle 60*c* is provided at one end of the rack 535*c* adjacent the cam 533*c*, the follower 534*c* is attached around the pivot axle 60*c*, and an outer surface of the follower 534*c* is contacted with an outer edge of the cam 533*c*. While rotating, the cam 533*c* interacts with the follower 534*c* so as to drive the follower 534*c* to urge the rack 535*c* to perform a reciprocating linear motion.

Preferably, the follower 534c is pivotably attached around the pivot axle 60c. When interacting with the cam 533c, the follower 534c pivots relative to the pivot axle 60c, and a rolling friction is formed between the follower 534c and the cam 535c, which effectively reduces the resistance between the follower 534c and cam 535c. Preferably, a locking groove is formed at a top end of the pivot axle, after the follower 534c is assembled to the pivot axle 60c, a locking ring 62c is locked in the locking groove, for limiting the position of the follower 534c in the axial direction.

Preferably, the follower 534c includes an inner ring 538c and an outer ring 539c. The inner ring 539c is fixed inside the outer ring 539c. The inner ring 538c and the outer ring 539c may be connected by interference fit or with adhesive. The inner ring 538c is made from Teflon, which has good smoothness, so that when the follower 534c pivots relative to the pivot axle 60c, the friction between the follower 534c and the pivot axle 60c can be effectively reduced, making the pivoting smoother. The outer ring 539c is made of stainless steel, which has good rigidity, so that when interacting with the cam 533c, the follower 534c can withstand the force of the cam 533c without being deformed or damaged. In this embodiment, wear resistant plates 64c are provided at top and bottom ends of the follower 534c, respectively, i.e. between the follower 534c and the locking ring 62c, and between the follower 534c and the rack 535c, to reduce wear during pivoting of the follower 534c.

In this embodiment, as shown in FIG. 34, the pivot axle 60c is a separate element which is assembled to the rack 535c. The rack 535c forms a corresponding through assembly hole. For facilitating axial positioning of the pivot axle 60c, the end of the pivot axle 60c protrudes radially outwardly to form an annular flange 61c. Correspondingly, a bottom end of the assembly hole has a step shape. When the pivot axle 60c passes through the assembly hole of the rack 535c from the bottom side of the rack 535c, the annular flange 61c of the end of the pivot axle 60c abuts against the step of the assembly hole to preliminarily position the pivot axle 60c in the axial direction. The top end of the pivot axle 60c passes through the assembly hole and extends beyond the rack 535c to be attached to the follower 534c. Afterwards, the locking ring 62c is used to finally connect the follower 534c with the pivot axle 60c and position the follower 534c on the pivot axle 60c. In other embodiments, the pivot axle 60c may extend integrally and outwardly from the rack 535c.

Figure 35:
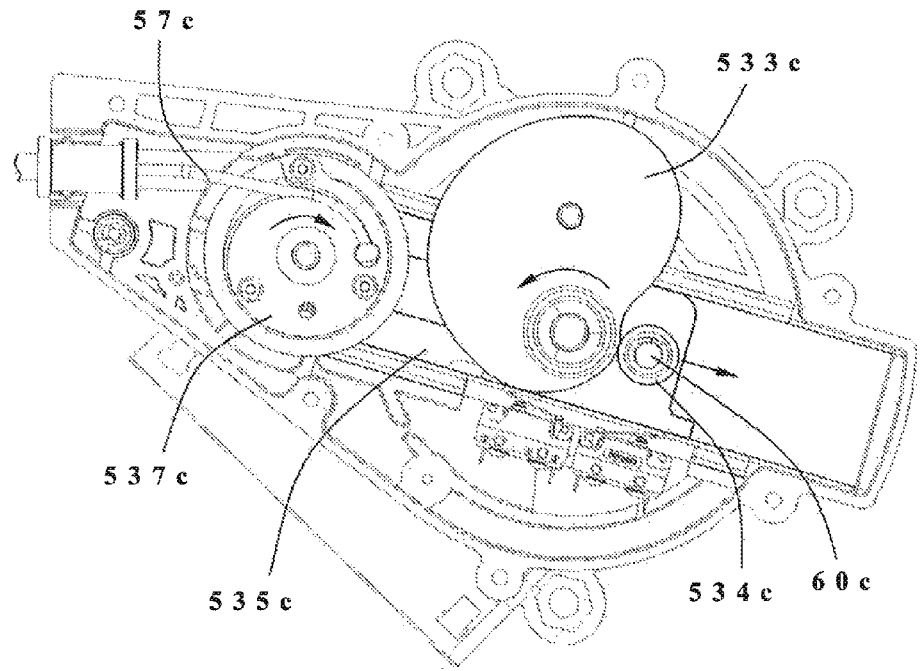
FIG. 35 illustrates the clutch of FIG. 31 in an initial state.

The reel 537c is meshed with the other end of the rack 535c, the traction cable 57c is connected with the reel 537c, the reciprocating motion of the rack 535c drives the reel 537c to rotate clockwise or counter-clockwise, causing the traction cable 57c to be wound up or released. In the present embodiment, the gear unit 531c drives the cam 533c to rotate in a counter-clockwise direction as shown in FIG. 35. The profile of the cam 533c is designed such that the movement (also referred to as a rise travel) of the follower 534c away from the reel 537c has a relatively slow speed, and the movement (also referred to as a return travel) of the follower 534c toward the reel 537c has a relatively fast speed, so as to ensure that the mowing operation can be stopped quickly, thereby improving safety.

When the rack 535c moves away from the reel 537c, the reel 537c rotates clockwise, the traction cable 57c is wound on the reel 537c, which drives the clutch pulley 58c to the second position to abut against the transmission belt 59c. On the contrary, when the cam 533c drives the rack 535c toward the reel 537c, the reel 537c rotates counter-clockwise, the traction cable 57c is released outwards, which allows the clutch pulley 58c to be separated from the transmission belt 59c and return to the first position. Preferably, a spring 56c is connected between the traction cable 57c and the clutch pulley 58c to buffer an acting force on the clutch pulley 58c. In addition, the spring 56c experiences a tensile deformation when the clutch 50c operates to wind the traction cable 57c on the reel 537, and when the reel 537c rotates counter-clockwise to release the traction cable 57c, a reset force of the spring 56c provides a tensile force, which accelerates the release of the traction cable 57c.

In an initial state, as shown in FIG. 30 and FIG. 32, the clutch pulley 58c is in the first position and is not in contact with the transmission belt 59c which is in a relaxed state, the rack 535c of the clutch 50c is near the reel 537c, and the follower 534c on the rack 535c is contacted with the proximal point of the cam 533c, the traction cable 57c is released outwards with a maximum length, and the spring 56c is in the natural state. When there is a need to start mowing, the button 20c is depressed, the cam 533c is driven to rotate in a low speed by the gear unit 531c, the contact point of the follower 534c and the cam 533c moves from the proximal point to the distal point, which drives the rack 535c to move away from the reel 537c and drives the reel 537c to rotate clockwise, the traction cable 55c is gradually wound up on the reel 537c, as shown in FIG. 36. At this time, the spring 56c is tensioned by the traction cable 57c to drive the clutch pulley 58c to move towards the second position to abut against the transmission belt 59c for tensioning it, and the power of the engine 10c can thus be transferred to the cutter head 30c via the transmission belt 59c, so as to drive the cutter head 30c to mow.

At this time, the motor 51c is powered-off, the clutch 50c is locked in the current state by a self-locking mechanism (not shown in this embodiment, and an illustrative construction of the self-locking mechanism is described in the second embodiment with reference to FIG. 9 to FIG. 18 above), the reel 537c keeps the traction cable 57c in a retracted state, and the transmission belt 59c keeps tensioning, thereby allowing the engine to drive the cutter head 30c to rotate continuously to perform the mowing operation. When there is a need to stop the mowing operation, the motor 51c is powered on again, as indicated by the arrow in FIG. 36, the cam 533c continues to rotate under the driving of the motor 51c, and the contact point between the cam 533c and the follower 534c moves from the distal point to the proximal point, the rack 535c moves reversely towards the reel 537c, which drives the reel 537c to rotate counter-clockwise and releases the traction cable 57c outwards. The clutch pulley 58c is reset to the first position from the second position, and is separated from the transmission belt 59c, so that the power transmission between the engine 10c and the cutter head 30c is disconnected, and the whole clutch 50c is returned to its initial state as shown in FIG. 35.

The mower 100c of the present invention takes the motor 51c as the power source, clockwise and counter-clockwise rotations of the reel 537c are realized by the engagement between the cam 533c and rack 535c of the clutch 50c, which drives the clutch pulley 58c to move between the first position and the second position. When compared to a hand lever which requires manual operation in the conventional technique, the user operation is simplified and less laborious. In addition, omission of the hand lever makes the appearance of the mower 100c more aesthetic. In addition, the rack 535c of the clutch 50c is provided with the follower 534c which interacts with the cam 533c, with a rolling friction formed between the follower 534c and the cam 533c to reduce the resistance to the cam 533c when rotating. Furthermore, the smooth inner ring 538c of the follower 534c reduces the frictional force between the follower 534c and the pivot axle 60c and the rigid outer ring 539c withstands the force of the cam 533c, which reduces wear of the components while forming a smooth transmission, thereby effectively increasing the response speed and lifespan of the clutch 50c.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

In other embodiments, for example, the reduction transmission mechanism or transmission unit 53 may also be replaced by other reduction transmission mechanisms or alternatively by a non-reduction transmission mechanism.

The invention claimed is:

1. A clutch, comprising a motor, a transmission mechanism connected with the motor and an output mechanism connected with the transmission mechanism, wherein the transmission mechanism comprises a cam driven by the motor and a follower reciprocating by contact with the cam as the cam rotates, and the reciprocation of the follower switches the output mechanism between a transmission state and a non-transmission state;
wherein the output mechanism comprises a reel and a traction cable, and the reciprocation of the follower causes the traction cable to be wound up on the reel or released outwards.

2. The clutch of claim 1, wherein a rise travel of the follower from contact with a proximal point of the cam to contact with a distal point of the cam switches the output mechanism to the transmission state, and a return travel of the follower from the distal point contact with the cam to the proximal point contact with the cam switches the output mechanism to the non-transmission state.

3. The clutch of claim 1, wherein the transmission mechanism further comprises a rack moving in synchronous with the follower and a driving gear rotated by the rack, wherein the reel rotates in synchronous with the driving gear.

4. The clutch of claim 1, wherein the reel comprises a reel body and a cover plate which are integrally assembled, the reel body comprises a bottom plate and a reel disc provided at one side of the bottom plate facing the cover plate, wherein a circular groove is formed among the cover plate, the bottom plate and circumferential outer surfaces of the reel disc.

5. The clutch of claim 4, wherein an axial end surface of the reel disc towards the cover plate is provided with a fixed groove which is in communication with the circular groove.

6. The clutch of claim 5, wherein the fixed groove is arc-shaped.

7. The clutch of claim 5, wherein the cover plate is provided thereon with a through-slot corresponding to the position of the fixed groove.

8. The clutch of claim 1, wherein the transmission mechanism further comprises a rack moving in synchronous with the follower, the cam rotates under the driving action of the motor and interacts with the follower, so as to convert the rotation of the motor into the reciprocation of the rack, and the output mechanism comprises the driving gear meshed with the rack, the reel connected onto the driving gear for synchronous rotation therewith, and the traction cable with one end thereof fixedly connected onto the reel, wherein the movement of the rack drives the driving gear and the reel to rotate, so that the traction cable is wound up on the reel or released outwards.

9. The clutch of claim 8, wherein the rack overlaps with the cam, the follower is a boss provided at an end of the rack away from the output mechanism.

10. The clutch of claim 8, wherein the transmission mechanism further includes a gear unit having an output shaft, the rotation of the motor outputs a relatively low rotation speed after being decelerated via the gear unit, the cam is fixedly connected onto the output shaft and synchronously rotates therewith, the output shaft is connected with the cam after passing through the rack, an elongated slot is formed in the rack for the output shaft to pass through, the elongated slot extends along a length direction of the rack.

11. The clutch of claim 1, wherein the cam has a motion angle for rise travel of less than 300 degrees and a motion angle for return travel of less than 100 degrees.

12. The clutch of claim 1, wherein the clutch further comprises a self-locking mechanism interacting with the transmission mechanism, wherein when the output mechanism is in the transmission state, the self-locking mechanism is configured to lock the output mechanism in the transmission state.

13. The clutch of claim 12, wherein the motor is powered off when the output mechanism is in the transmission state.

14. The clutch of claim 12, wherein, when driven by the motor, the transmission mechanism contacts a radial side surface of the self-locking mechanism which exerts a radial force on the transmission mechanism, when subject to an external counteracting force transmitted from the output mechanism, the transmission mechanism interacts with a circumferential end surface of the self-locking mechanism and the self-locking mechanism exerts a tangential force on the transmission mechanism such that the transmission mechanism is stuck and cannot rotate.

15. The clutch of claim 12, wherein the self-locking mechanism comprises a locking pin, one end of the locking pin is a positioning end, the other end of the locking pin is a free end abutting against the transmission mechanism, the transmission mechanism forms a notch, the locking pin is engaged in the notch when the output mechanism is switched to the transmission state, and the locking pin moves away from the notch when the output mechanism is switched to the non-transmission state.

16. The clutch of claim 15, wherein the self-locking mechanism further comprises a spring, the free end of the locking pin is disposed between the spring and the transmission mechanism, the locking pin compresses the spring when moving away from the notch and allows the spring to return to its initial state when entering the notch.

17. The clutch of claim 15, wherein a housing of the clutch is formed with a recess for receiving the locking pin, a portion of the recess for receiving the positioning end has the same shape and size as the positioning end, and a portion of the recess for receiving the free end has a width greater than that of the free end.

18. The clutch of claim 16, wherein the self-locking mechanism further comprises a clamp on which the locking pin is supported, barbs extend outwardly from the clamp, a housing of the clutch forms locking holes, and the barbs are engaged in their respective locking holes to position the self-locking mechanism.

19. The clutch of claim 13, wherein the transmission mechanism comprises a gear unit that produces a self-locking force for enhancing a locking function of the self-locking mechanism when the output mechanism is in the transmission state.

20. The clutch of claim 12, wherein the transmission mechanism comprises a gear unit connected with the motor, the gear unit comprises an output shaft with a notch formed thereon, and the self-locking mechanism and the notch of the output shaft interact to permit the output shaft to rotate only in a fixed direction.

21. The clutch of claim 12, wherein a rise travel of the follower from contact with a proximal point of the cam to contact with a distal point of the cam switches the output mechanism to the transmission state, and a return travel of the follower from the distal point contact with the cam to the proximal point contact with the cam switches the output mechanism to the non-transmission state.

22. The clutch of claim 21, wherein the transmission mechanism further includes a rack meshed with the output mechanism, the follower drives the rack to perform a reciprocating motion when the cam is rotating.

23. The clutch of claim 21, wherein the transmission mechanism drives the rack to perform a reciprocating motion which rotates the reel clockwise or counter-clockwise, so that the traction cable is wound up on the reel or released outwards.

24. The clutch of claim 1, wherein the clutch comprises at least one electric switch electrically connected with the motor, and turn-on or turn-off of the electric switch is controlled by the transmission mechanism.

25. The clutch of claim 24, wherein the clutch includes two said electric switches, the two electric switches are both controlled by the transmission mechanism and always have opposite states.

26. The clutch of claim 25, wherein the two electric switches are respectively connected in series with the motor to form two branches.

27. The clutch of claim 24, wherein the clutch further comprises a self-locking mechanism, when the output mechanism is switched to the transmission state, the electric switch disconnects the power to the motor and the self-locking mechanism keeps the output mechanism in the transmission state.

28. The clutch of claim 24, wherein one end of the traction cable is connected with the transmission mechanism, and the other end of the traction cable is connected with an external mechanism.

29. The clutch of claim 24, wherein the transmission mechanism is formed with a groove, a side surface of the electric switch facing the groove is provided with a button and a resilient tab, the resilient tab extends obliquely and outwardly from the electric switch toward the groove, when the transmission mechanism operates under the driving of the motor, the groove slides or rotates relative to the electric switch, making the resilient tab enter or exit the groove, when the resilient tab exits the groove, the transmission mechanism compresses the resilient tab making the resilient tab deform and press the button such that the electric switch is turned on/turned off, when the resilient tab enters the groove, the resilient tab returns to its original state which no longer presses the button, and the button is reset, such that the electric switch is turned off/turned on.

30. The clutch of claim 29, wherein the transmission mechanism comprises a rack driven by the cam and meshed with the reel, the cam, while rotating, drives the rack to move, which in turn rotates the reel that is meshed with the rack, so that the traction cable is wound up or released outwards.

31. The clutch of claim 30, wherein the groove is formed in one side of the rack, and the movement of the rack causes the resilient tab of the switch to enter or exit the groove.

32. The clutch of claim 30, further comprising a driving block rotating in synchronous with the cam, wherein the switch is located on a rotation path of the driving block, the groove is formed in an outer circumferential surface of the driving block, and the resilient tab of the switch enters or exits the groove when the driving block rotates.

33. The clutch of claim 25, wherein a groove is formed in the transmission mechanism, the two electric switches are arranged side by side in a transverse direction, when one of the switches slides out of the groove, the other one of the switches slides into the groove, such that both of the switches change in state.

34. The clutch of claim 25, wherein two grooves are formed in the transmission mechanism, with each groove corresponding to one switch, the two switches are offset from each other both in the axial and circumferential directions, when one switch slides into its corresponding groove, the other switch slides out of its corresponding groove, such that both of the switches change in state.

35. The clutch of claim 1, wherein an outer surface of the follower contacts an outer edge of the cam, the cam, while rotating, drives the follower to perform a reciprocating linear motion, a rise travel of the follower from contact with a proximal point of the cam to contact with a distal point of the cam switches the output mechanism to the transmission state, and a return travel of the follower from the distal point contact with the cam to the proximal point contact with the cam switches the output mechanism to the non-transmission state.

36. The clutch of claim 2, wherein an outer surface of the follower contacts an outer edge of the cam, the cam, while rotating, drives the follower to perform a reciprocating linear motion, the follower comprises an inner ring and an outer ring, the inner ring is made of Teflon, the outer ring is made of stainless steel which is fixedly attached around the inner ring, and an outer circumferential surface of the outer ring contacts the outer edge of the cam.

37. The clutch of claim 36, wherein the inner ring of the follower is pivotably attached around a pivot axle, a top end of the pivot axle is formed with a locking groove, and a locking ring is engaged in the locking groove to limit the position of the follower.

38. The clutch of claim 37, wherein the transmission unit further includes a rack, the pivot axle is provided at one end of the rack, the reel is meshed with the other end of the rack, the traction cable comprises one end which is fixedly connected to the reel, the rise travel of the follower drives the reel to rotate in a first direction such that the traction cable is wound up on the reel, and the return travel of the follower drives the reel to rotate in a second direction such that the traction cable is released outwards.

39. The clutch of claim 38, wherein the rack forms a through assembly hole, a bottom of the assembly hole is step-shaped, the pivot axle extends into the assembly hole of the rack, a bottom end of the pivot axle is formed with an annular flange, and the annular flange abuts against the rack at the step of the assembly hole.

40. The clutch of claim 35, wherein the transmission mechanism further includes a gear unit having an output shaft, the rotation of the motor outputs a relatively low rotation speed after being decelerated via the gear unit, and the cam is fixedly connected onto the output shaft and synchronously rotates therewith.

41. The clutch of claim 40, wherein a rack overlaps with the cam, the output shaft is connected with the cam after passing through the rack, an elongated slot is formed in the rack for the output shaft to pass through.

42. The clutch of claim 35, wherein the profile of the cam is designed such that the rise travel of the follower has a relatively slow speed, and the return travel of the follower has a relatively fast speed.

43. A mower, comprising an engine, a cutter head and the clutch of claim 1, wherein the power of the engine is transferred to the cutter head for performing mowing operations when the output mechanism of the clutch is in a transmission state, and the power of the engine is not transferred to the cutter head when the output mechanism of the clutch is in a non-transmission state.

44. A clutch, comprising a motor, a transmission mechanism connected with the motor and an output mechanism connected with the transmission mechanism, the transmission mechanism is configured to drive the output mechanism to switch between a transmission state and a non-transmission state, wherein the clutch further comprises a self-locking mechanism interacting with the transmission mechanism, wherein when the output mechanism is in the transmission state, the self-locking mechanism is configured to lock the output mechanism in the transmission state; wherein the output mechanism comprises a reel and a traction cable, and the reciprocation of the follower causes the traction cable to be wound up on the reel or released outwards.

45. A clutch, comprising a motor, a transmission mechanism connected with the motor and an output mechanism connected with the transmission mechanism, the transmission mechanism is configured to drive the output mechanism to switch between a transmission state and a non-transmission state, wherein the clutch comprises at least one electric switch electrically connected with the motor, and turn-on or turn-off of the electric switch is controlled by the transmission mechanism; wherein the output mechanism comprises a reel and a traction cable, and the reciprocation of the follower causes the traction cable to be wound up on the reel or released outwards.

46. A clutch, comprising a motor, a transmission mechanism connected with the motor and an output mechanism connected with the transmission mechanism, wherein the transmission mechanism comprises: a cam driven by the motor; a follower reciprocating by contact with the cam as the cam rotates, and the reciprocation of the follower switches the output mechanism between a transmission state and a non-transmission state;

wherein the output mechanism comprises a reel and a traction cable, and the reciprocation of the follower causes the traction cable to be wound up on the reel or released outwards, wherein the rack moves in synchronous with the follower, the cam rotates under the driving action of the motor and interacts with the follower, so as to convert the rotation of the motor into the reciprocation of the rack, and the output mechanism comprises the driving gear meshed with the rack, the reel connected onto the driving gear for synchronous rotation therewith, and the traction cable with one end thereof fixedly connected onto the reel, wherein the movement of the rack drives the driving gear and the reel to rotate, so that the traction cable is wound up on the reel or released outwards, wherein the clutch further comprises a self-locking mechanism interacting with the transmission mechanism, the self-locking mechanism is configured to lock the output mechanism in the transmission state when the output mechanism is in the transmission state, wherein the clutch comprises at least one electric switch electrically connected with the motor, and turn-on or turn-off of the electric switch is controlled by the transmission mechanism, wherein the transmission mechanism further includes a gear unit having an output shaft, the rotation of the motor outputs a relatively low rotation speed after being decelerated via the gear unit, and the cam is fixedly connected onto the output shaft and synchronously rotates therewith.

47. A mower, comprising an engine, a cutter head and the clutch of claim 46, wherein the power of the engine can be transferred to the cutter head for performing mowing operation when the output mechanism of the clutch is in a transmission state, and a transmission between the engine and the cutter head is disconnected when the output mechanism of the clutch is in a non-transmission state.

* * * * *